(12) United States Patent
Joseph

(10) Patent No.: US 11,811,866 B2
(45) Date of Patent: Nov. 7, 2023

(54) COMPUTER-IMPLEMENTED SYSTEM AND METHOD FOR CONTROLLING PROCESSING STEPS OF A DISTRIBUTED SYSTEM

(71) Applicant: nChain Licensing AG, Zug (CH)

(72) Inventor: Daniel Joseph, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/099,228

(22) Filed: Jan. 19, 2023

(65) Prior Publication Data

US 2023/0231908 A1 Jul. 20, 2023

Related U.S. Application Data

(63) Continuation of application No. 17/260,976, filed as application No. PCT/IB2019/056014 on Jul. 15, 2019, now Pat. No. 11,575,744.

(30) Foreign Application Priority Data

Jul. 19, 2018 (GB) ..................................... 1811773

(51) Int. Cl.
*H04L 67/1074* (2022.01)
*H04L 9/08* (2006.01)
(Continued)

(52) U.S. Cl.
CPC .......... *H04L 67/1078* (2013.01); *H04L 9/085* (2013.01); *H04L 9/0825* (2013.01);
(Continued)

(58) Field of Classification Search
CPC ... H04L 67/1078; H04L 9/0825; H04L 9/085; H04L 9/14; H04L 9/3073; H04L 9/50
See application file for complete search history.

(56) References Cited

U.S. PATENT DOCUMENTS

2018/0181957 A1  6/2018  Crabtree et al.
2018/0284758 A1* 10/2018  Cella ................. G05B 23/0283
(Continued)

OTHER PUBLICATIONS

Aliev, "Lightning Network in Depth, Part 1: Payment Channels," retrieved from https://medium.com/softblocks/lightning-network-in-depth-part-1-payment-channels-b943607950dd, Mar. 4, 2022, 16 pages.

(Continued)

*Primary Examiner* — Azizul Choudhury
(74) *Attorney, Agent, or Firm* — Davis Wright Tremaine LLP

(57) ABSTRACT

A method of controlling and coordinating of processing steps in a distributed system can be implemented by an initiator node of a cyclically-ordered set of nodes participating in a blockchain network (e.g., Bitcoin blockchain). The method includes generating a private key and cryptographic shares thereof for the nodes of the set and distributing them. A locking value is determined based on the shares and a transaction is arranged to transmit control of a resource responsive to supply of a corresponding unlocking value. A circuit of transactions amongst the nodes each arranged to transmit control of a resource responsive to supply of an unlocking value corresponding to a locking value determined based on the share distributed to a first node of one of two adjacent nodes and a value received from another node immediately previous to it is prepared. The initiator node may belong to a cyclically-ordered set of initiator nodes.

15 Claims, 20 Drawing Sheets

(51) Int. Cl.
  *H04L 9/14* (2006.01)
  *H04L 9/30* (2006.01)
  *H04L 9/00* (2022.01)
(52) U.S. Cl.
  CPC .............. *H04L 9/14* (2013.01); *H04L 9/3073* (2013.01); *H04L 9/50* (2022.05)

(56) References Cited

U.S. PATENT DOCUMENTS

2018/0285996 A1   10/2018  Ma
2019/0208414 A1*  7/2019  Roennow ............ G06F 16/1824

OTHER PUBLICATIONS

Aliev, "Lightning Network in Depth, Part 2: HTLC and Payment Routing," retrieved from https://medium.com/softblocks/lightning-network-in-depth-part-2-htlc-and-payment-routing-db46aea445a8, Mar. 8, 2018, 12 pages.
Antonopoulos, "Mastering Bitcoin—Unlocking Digital Cryptocurrencies," O'Reilly Media, Inc., Dec. 20, 2014, 282 pages.
International Search Report and Written Opinion for Application No. PCT/IB2019/056014, dated Sep. 27, 2019, filed Jul. 15, 2019, 10 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0; prev_next=prev, 2 pages.
Wilkinson, "Introduction to Micropayment Channels," retrieved from https://medium.com/@super3/introduction-to-micropayment channels-5beb3bb224c1, Sep. 30, 2017, 6 pages.
UK IPO Search Report dated Jan. 11, 2019, Patent Application No. GB1811773.9, 7 pages.

* cited by examiner

| 1600 | |
|---|---|
| 100 | Transaction-ID |
| Version Number | Version number |
| <#> | Number of inputs |
| <Ref> | Prev Trans Output |
| <#> | Prev Trans Output index |
| Script length | Script length |
| <Script> | ScriptSig |
| <ScriptSignatureFlags> | ScriptSig |
| Sequence number | Sequence number |
| <#> | Number of Outputs |
| $x$BTC | Output value |
| Output Script Length | Output script length |
| redeemScript:<br>OP_IF<br>    OP_2 <pubkey $U_A$> <pubkey $U_B$> OP_2 OP_CHECKMULTISIG<br>OP_ELSE<br>    <basepoint $G$> OP_ECPMULT <$Q_B$> OP_EQUALVERIFY <pubkey $U_B$><br>OP_CHECKSIG<br>OP_ENDIF<br><br>scriptPupkey:<br>OP_HASH160 <$H(redeemScript)$> OP_EQUAL | Output script |
| LockTime | LockTime |

FIG. 16

| 1700 | |
|---|---|
| <ID> | Transaction-ID |
| Version Number | Version number |
| <#> | Number of inputs |
| 100 | Prev Trans ID |
| 0 | Prev Trans Output index |
| Script length | Script length |
| OP_0 <sig $U_A$> <sig $U_B$> OP_TRUE <$T_c$ redeemScript> | ScriptSig |
| <ScriptSignatureFlags> | ScriptSig |
| Sequence number | Sequence number |
| <#> | Number of Outputs |
| $x$BTC | Output value |
| Output Script Length | Output script length |
| OP_DUP OP_HASH160 <$H$(pubkey $U_A$)> OP_EQUALVERIFY OP_CHECKSIG | Output script |
| $f(\{s_i : i \in [\alpha, \omega]\})$ | LockTime |

FIG. 17

| 1800 | |
|---|---|
| <ID> | Transaction-ID |
| Version Number | Version number |
| <#> | Number of inputs |
| 100 | Prev Trans ID |
| 0 | Prev Trans Output index |
| Script length | Script length |
| <sig $U_B$> <$sv_B$> <$T_c$ redeemScript> | ScriptSig |
| <ScriptSignatureFlags> | ScriptSig |
| Sequence number | Sequence number |
| <#> | Number of Outputs |
| $x$BTC | Output value |
| Output Script Length | Output script length |
| OP_DUP OP_HASH160 < $H$(pubkey $U_B$) > OP_EQUALVERIFY OP_CHECKSIG | Output script |
| LockTime | LockTime |

FIG. 18

| <scriptSig> $T_{Pay}$ | <scriptPubkey> $T_c$ | Combined (r_hash) STACKED | Combined (r_pure) STACKED |
|---|---|---|---|
| <sig $U_B$><br><$sv_B$><br><$T_c$ redeemScript> | Redeem Pure<br><br><basepoint G><br>OP_ECPMULT<br><$Q_B$><br>OP_EQUALVERIFY<br><pubkey $U_B$><br>OP_CHECKSIG<br><br>Redeem Hash<br>OP_HASH160<br><H(redeemScript)><br>OP_EQUAL | OP_EQUAL<br><H(redeemScript)><br>OP_HASH160<br><$T_c$ redeemScript><br><$sv_B$><br><sig $U_B$> | OP_CHECKSIG<br><pubkey $U_B$><br>OP_EQUALVERIFY<br><$Q_B$><br>OP_ECPMULT<br><basepoint G><br><$sv_B$><br><sig $U_B$> |

COMPUTER-IMPLEMENTED SYSTEM AND METHOD FOR CONTROLLING PROCESSING STEPS OF A DISTRIBUTED SYSTEM

CROSS REFERENCE TO RELATED APPLICATIONS

This application is a continuation of U.S. patent application Ser. No. 17/260,976, filed Jan. 15, 2021, entitled "COMPUTER-IMPLEMENTED SYSTEM AND METHOD FOR CONTROLLING PROCESSING STEPS OF DISTRIBUTED SYSTEM," which is a 371 National Stage of International Patent Application No. PCT/IB2019/056014, filed Jul. 15, 2019, which claims priority to United Kingdom Patent Application No. 1811773.9, filed Jul. 19, 2018, the disclosures of which are incorporated herein by reference in their entirety.

SUMMARY

This disclosure relates generally to decentralized computing systems, and more particularly to control and coordination of processing steps associated with nodes of a distributed system, including directing and controlling ordered processing steps using a blockchain network.

In distributed computing systems, various computing devices acting as nodes in the distributed system may communicate via a network. Messages may be exchanged between these nodes. Such an exchange of messages may, for example, allow the nodes to cooperate to perform computing tasks. Such tasks may involve processing distributed across various of the nodes. Such distributed processing may require control and coordination of steps associated with various of the nodes. For example, a particular processing order may be enforced.

One example of a distributed system may arise the context of an aircraft information system. For example, an aircraft information system may include a variety of subsystems each of which is comprised of subcomponents. Each of these subsystems may be responsible for performing particular processing such as, for example, in performing a pre-flight check. In order to perform those steps, each of the subsystems may require the subcomponents to perform particular processing steps.

In such distributed systems, it may be necessary or desirable to be able to enforce the order of steps in processing and/or the order of steps forming particular processing. For example, the subsystems may need to perform their respective processing in order. Additionally, nodes associated with the subcomponents may need to perform their respective processing steps in order.

Additionally, it may be desirable to provide a tamperproof or tamper-resistant audit trail recording outputs of processing steps or particular processing. Such an audit trail may have applications in a variety of scenarios. For example, in the context of aircraft this may, for example, allow incidents to be investigated forensically such as, for example, after an accident. In a particular example, such a system may allow failures to be attributed to particular subsystems of the aircraft such as, for example, for root-cause determination.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

A method, system, and computer-readable storage medium for controlling and coordinating of processing steps in a distributed system that may be implemented by a node in a cyclically-ordered set of nodes participating in a blockchain network were disclosed in co-owned UK Patent Application No. 1806448.5 entitled "Computer-Implemented Methods and Systems", filed 20 Apr. 2018. The subject matter of that application includes description of a protocol which could be termed the Multifactor Dependent Decisions (MDD) protocol. The subject matter of that application may be employed to provide ordering of steps amongst nodes of a distributed system. For example, it may be used to provide ordering of processing steps within a system.

Other methods, systems, and computer-readable storage media for providing functionality in distributed systems formed of cyclically-ordered set of nodes participating in a blockchain network were disclosed in co-owned UK Patent Application Nos. 1706071.6, 1802063.6 each entitled Computer-Implemented Methods and Systems", filed 18 Apr.

2017 and 8 Feb. 2018, respectively. The former includes disclosure relating to a protocol named Group Random Exchange (GRE) which may allow funds to be move from one address to another, obscuring the link between the addresses associated with an entity while removing the possibility of that entity having its resources misappropriated. By way of overview, GRE builds on the concept of a group agreeing for each member of a group of nodes to transfer x units of computing resources to one other member such that everyone receives x units of computing resources. It also includes disclosure relating to a variation of the GRE protocol, Group Random Exchange Change Secret (GRECS) which changes the GRE protocol so as to provide identical function while using a different secret value for each payment channel. In particular, each node participating in the GRECS protocol sends a respective secret value to an initiator node which then uses these values to initiate the transfers. The latter includes disclosure relating to an improvement to the GRE protocol and, more particularly, to the GRECS protocol. This improved protocol, Group Random Exchange Late Reveal (GRELR) improves GRECS by avoiding the need to use a common secret.

Notably, however, it may, as discussed above, be desirable to be able to control ordering of processing not only amongst the components of a system—e.g., between subsystems—but also to control ordering of processing amongst and between the subcomponents making up a particular subsystem. Additionally, it may be desirable to be able to allow processing by a particular subsystem to be optionally skipped or omitted.

Such an improved solution has now been devised.

Thus, in accordance with the present disclosure there is provided a method as defined in the appended claims.

In accordance with the disclosure there may be provided a computer-implemented method. The method may include generating, by a first initiator node of a first cyclically-ordered set of nodes participating in a blockchain network, a private key. The method may include generating, by the first initiator node, a cryptographic share of the private key for each of the nodes of the first set and distributing respective ones of the cryptographic shares to the other nodes of the first set. The method may include determining, by the first initiator node, a first locking value based on public keys corresponding to each of the cryptographic shares. The method may include preparing, by the first initiator node, a transaction arranged to transmit control of a resource from a source address associated with the first initiator node to a receiving address of a node immediately subsequent to the first initiator node in the first set responsive to satisfaction of an execution condition including supply of a first unlocking value corresponding to the first locking value. The method may include initiating, by the first initiator node, preparation of further transactions to form a circuit of transactions between each pair of adjacent nodes in the first set, each of the further transactions arranged to transmit control of a respective resource from an address associated with a first node of each pair to an address associated a second node of that pair responsive to satisfaction of an execution condition including supply of a respective unlocking value corresponding to a respective locking value. The second node of each pair may be immediately subsequent in the first set to the first node of that pair. The respective locking value may be determined based on the cryptographic share that was distributed to the first node of a given pair and a value received from a node immediately previous that node in the first set.

In some implementations, the method may include sending, by the first initiator node to a master initiator node of a cyclically-ordered set of initiator nodes, a public key corresponding to the private key. Each of the initiator nodes of the set of initiator nodes may be an initiator node of a respective one of a plurality of cyclically-ordered sets of nodes. The plurality of cyclically-ordered sets of nodes may include the first set. The method may include receiving, by the first initiator node from a second initiator node, a first value based on public keys associated with each node in that set from the first initiator node through to the master initiator node. The second initiator node may be immediately previous to the first initiator node in the set of initiator nodes.

In some implementations, the method may include determining, by the first initiator node, a second locking value based on the first value and the public key corresponding to the private key. The method may include preparing, by the first initiator node, a transaction arranged to transmit control of a resource from a source address associated with the first initiator node to a receiving address of a third initiator node responsive to satisfaction of an execution condition including supply of a second unlocking value corresponding to the second locking value. The third initiator node may be immediately subsequent to the first initiator node in the set of initiator nodes.

In some implementations, the method may include obtaining, by the first initiator node, a second value based on private keys corresponding to public keys associated with each node in the set of initiator nodes from the third initiator node through to the master initiator node.

In some implementations, the second value may be obtained by the first initiator node from the blockchain.

In some implementations, the second value may be obtained by the first initiator node from the third initiator node.

In some implementations, the method may include determining, by the first initiator node that execution of the circuit of transactions should not be initiated. The method may include, responsive to determining that execution of the circuit of transactions should not be initiated: determining, by the first initiator node, a third unlocking value based on the second value and the private key; and executing, by the first initiator node using the third unlocking value, a transaction prepared by the second initiator node and arranged to transmit control of a resource from a source address associated with second initiator node to a receiving address of the first initiator node. Control of the resource may be transmitted responsive to satisfaction of an execution condition including supply of the third unlocking value.

In some implementations, the first locking value may be further based on the second value.

In some implementations, the method may include determining, by the first initiator node that execution of the circuit of transactions should be initiated and responsive to determining that execution of the circuit of transactions should be initiated: determining, by the first initiator node, a fourth unlocking value based on the second value and on a respective one of the cryptographic shares of the private key; and executing, by the first initiator node using the fourth unlocking value, a transaction prepared by a node immediately previous the initiator node in the first cyclically-ordered set of nodes arranged to transmit control of a resource from a source address associated with the immediately previous node to a receiving address of the initiator node. Control of the resource may be transmitted responsive to satisfaction of an execution condition including supply of the fourth unlocking value.

In some implementations, the initiating the preparation of further transactions to form a circuit of transactions between each pair of adjacent nodes in the first set may include sending, by the first initiator node, the first locking value to the node immediately subsequent to the first initiator node in the first set.

In some implementations, each of the resources may be of the same quantum as the others of the resources.

In some implementations, each public key and its corresponding private key may form an elliptic curve cryptography public-private key pair.

In some implementations, the cryptographic shares of the private key may be generated using a publicly verifiable cryptographic secret sharing algorithm.

The disclosure also provides a system, comprising including a processor and memory. The memory includes executable instructions that, as a result of execution by the processor, cause the system to perform any embodiment of the computer-implemented method described herein.

The disclosure also provides a non-transitory computer-readable storage medium having stored thereon executable instructions that, as a result of being executed by a processor of a computer system, cause the computer system to at least perform an embodiment of the computer-implemented method described herein.

BRIEF DESCRIPTION OF THE DRAWINGS

These and other aspects of the present disclosure will be apparent from and elucidated with reference to, the embodiment described herein. An embodiment of the present disclosure will now be described, by way of example only, and with reference to the accompany drawings, in which:

FIG. 16 illustrates an example Bitcoin transaction which may serve as the commitment transaction of a payment channel;

FIG. 17 illustrates an example Bitcoin transaction which may serve as the refund transaction of a payment channel;

FIG. 18 illustrates an example Bitcoin transaction which may serve as the payment transaction of a payment channel;

FIG. 19 shows how aspects of the commitment transaction of FIG. 19 may be combined with aspects of the payment transaction of FIG. 18.

DETAILED DESCRIPTION

Figure 1:
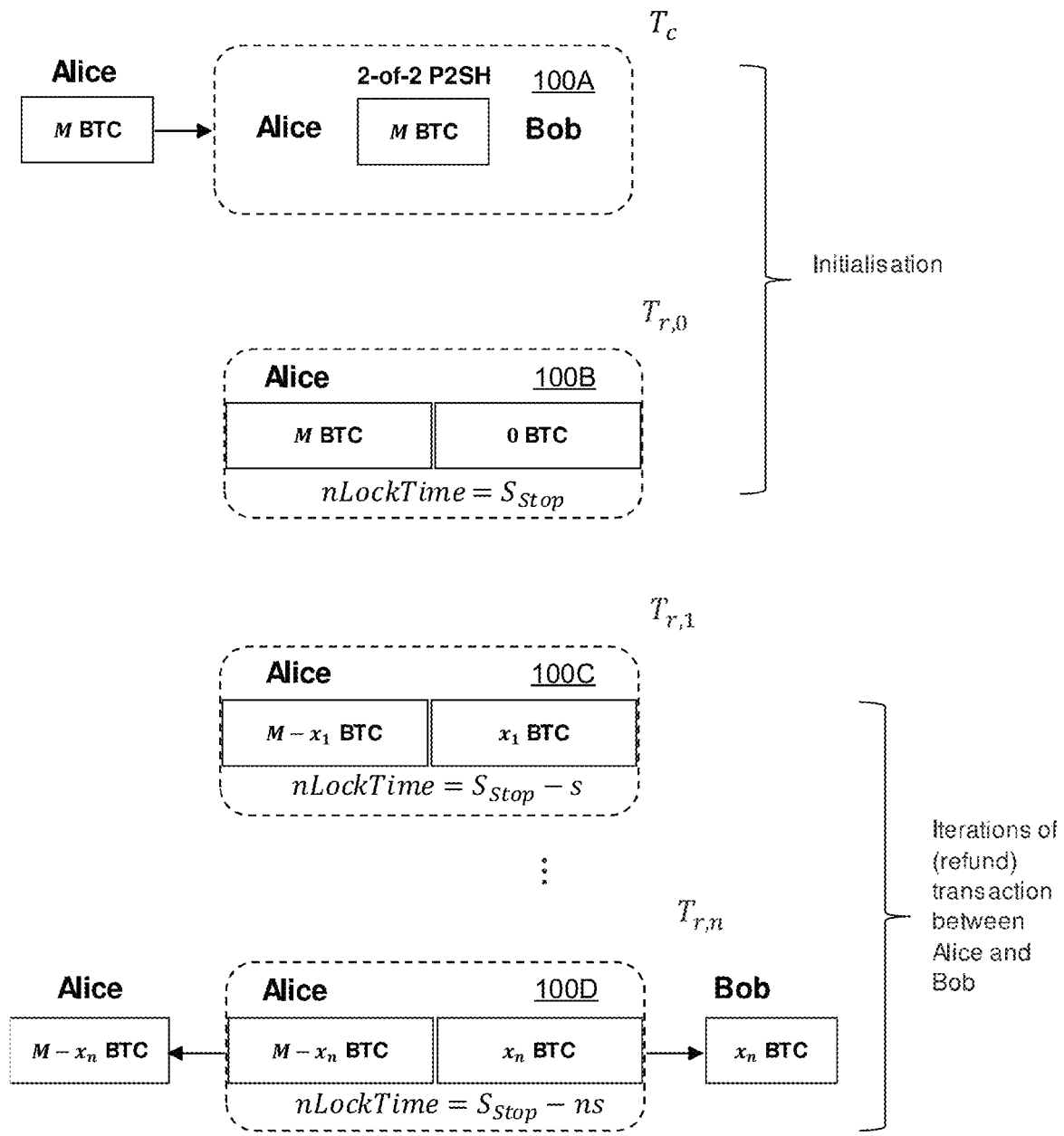
FIG. 1 is a diagram showing the transactions used in a payment channel.

Like reference numerals are used in the drawings to denote like elements and features.

A protocol embodying the present disclosure is described herein for a group of cooperating nodes to each make decisions in an ordered fashion. It is built on the concept by requiring nodes to commit units of computing resources that they may only recover by the utilization of an accumulated secret value that was derived from outputs of previous steps in a processing task.

Several concepts will now be described by way of background.

The protocol described herein builds on an existing Bitcoin-related technology, Payment Channels (see, e.g., 'Introduction to Micropayment Channels' http://super3.org/introduction-to-micropayment-channels/), which is a technique designed for off-block Bitcoin transactions between a pair of participants and notably incorporates the usage of refund transactions.

Payment Channels

As mentioned above, payment channels are referred to in the following description and so an overview of payment channels follows for the convenience of the reader.

Payment channels are techniques designed for parties to make multiple cryptocurrency transactions without committing all of the transactions to the blockchain. In a typical payment channel implementation, a nearly unlimited amount of payments can be made but it is only ever necessary to add two transactions to the blockchain.

In addition to the reduced number of transactions being added to the blockchain and the associated reduced costs, payment channels also offer the advantage of speed and, importantly, the ability of the parties to have units refunded if the things do not go as planned or either participant decides not to proceed beyond a certain set of payments. A description of a payment channel implementation is outlined below.

Consider the scenario where Alice needs to transfer blockchain resources to Bob. This may require multiple payments from Alice to Bob over a period of time as the situation demands. Alice expects to transfer at most, for example, 15 BTC (in total) to Bob in the possible set of exchanges. To facilitate this, a payment channel is established between Alice and Bob and operates as follows.

First, Alice creates a 2-of-2 multi-signature pay-to-script hash (P2SH) transaction, $T_c$, governed by both Alice and Bob that commits 15BTC originating from Alice. At this point the transaction is not submitted to the Bitcoin network (such a multi-signature address requires that 2 individuals (Alice and Bob) cryptographically sign any transaction that spends money from this address);

Next, Alice creates a separate refund transaction, $T_{r,0}$, returning all units of the multi-signature controlled funds to Alice. This transaction includes an nLockTime value of 100 blocks (nLockTime is a Bitcoin transaction parameter that allows a Bitcoin transaction to only be executable after a specified time has passed). Bob signs the transaction. This refund transaction allows Alice to be refunded, after nLock-Time has transpired, if the exchange between Alice and Bob goes awry;

Next, Alice signs the original transaction $T_c$.

At this point Alice and Bob may proceed to create new refund transactions to reflect the (off the blockchain) transfers being made from Alice to Bob. These refund transactions would reflect the net quantity of resources that Alice is required to transfer to Bob at that point in time. As an example, if Alice is to transfer Bob 5BTC, a new refund transaction, $T_r$, j, is created that has an output sending 5BTC to Bob and 10BTC back to Alice. If Alice needs to transfer another 5BTC to Bob then the new refund transaction, $T_{r,i+1}$, is created with outputs sending 10BTC to Bob and 5BTC to Alice. For each new refund transaction, assuming they are in agreement with the details, both parties sign the transaction but do not necessarily submit the transaction to the network.

Note that each successive refund transaction created has a lower nLockTime than that of the previous refund transaction—i.e., nLockTime($T_{r,i+1}$)<nLockTime($T_{r,i}$).

If a participant refuses to sign any $T_{r,i}$ then an aggrieved participant may simply submit the $T_{r,i-1}$. In the worst-case scenario Alice signs $T_{r,0}$ and submits it to the network reclaiming all her units (after nLockTime has expired).

The final refund transaction constructed represents the net sum of the units being transferred from Alice to Bob. This transaction is submitted to the network.

FIG. 1 shows the transactions $T_c$ 100A, and $T_{r,n}$ 100D used in a payment channel. M represents the maximum amount of money that may be sent from Alice to Bob. $x_i$ is the current net sum of the units Alice needs to pay to Bob. $S_{stop}$ is the nLockTime on the initial refund transaction. n is the number of refund transactions created in the ongoing (off-block) transfers made between Alice and Bob (this excludes the initial refund transaction). s is the time allotted for both participants (Alice and Bob) to agree to a refund transaction before a party risks the other party submitting the previous refund transaction, effectively ending the exchanges between Alice and Bob.

Note that: t+n*s<$S_{stop}$, where t is the current time, and ($S_{stop}$−n*s)≥s.

Transactions $T_c$ 100A, $T_{r,0}$ 100B, $T_{r,1}$ 100C, and $T_{r,n}$ 100D of FIG. 1 are transactions that may appear on the blockchain.

Figure 2:
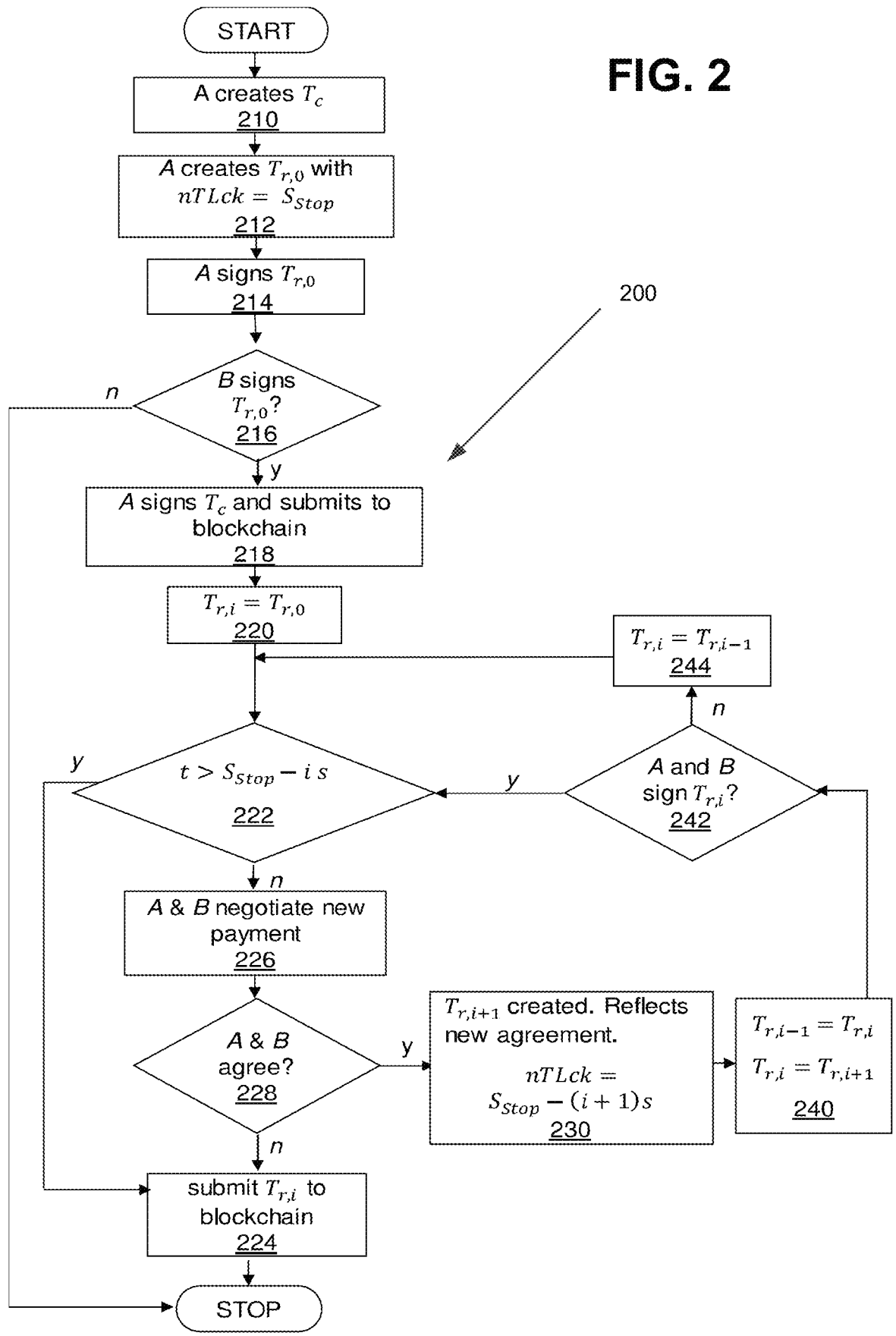
FIG. 2 is a flowchart illustrating how a payment channel in accordance with FIG. 1 may be created.

Operations for constructing the payment channel between Alice and Bob are shown to a flowchart 200 of FIG. 2. Operations 210 and onward are performed by one or more processors of one or more computing devices executing software comprising computer-executable instructions as may be stored on a computer-readable storage medium.

At the operation 210, a processor of a computing device associated with Alice creates a 2-of-2 multi-signature pay-to-script hash (P2SH) transaction, $T_c$, in manners described above.

From the operation 210, control flow proceeds to an operation 212. At the operation 212, a processor of a computing device associated with Alice creates a separate refund transaction, $T_{r,0}$, returning all units of the multi-signature controlled funds to an account associated with Alice in manners described above.

From the operation 212, control flow proceeds to an operation 214. At the operation 214, a processor of a computing device associated with Alice signs the above-described refund transaction.

From the operation 214, control flow proceeds to an operation 216. At the operation 214, a processor of a computing device associated with Bob may also sign the above-described refund transaction. If the transaction is so signed, control flow advances to an operation 218. Alternatively, if the transaction is not so signed, creation of the payment channel is aborted.

At the operation 218, a processor of a computing device associated with Alice signs $T_c$ and submits it to the blockchain. Control flow then advances to an operation 220.

At the operation 220, the above-mentioned refund transaction is recognized as a first refund transaction so that a further transfer from Alice to Bob can be negotiated later.

From the operation 220, control flow advances to an operation 222. At the operation 222, it is determined with sufficient time remains to negotiate the further transfer. If there is not sufficient time remaining, control flow advances to an operation 224 where the last refund transaction is submitted to the blockchain. Alternatively, if sufficient time remains, control flow advances to an operation 226.

At the operation 226, a further transfer between Alice and Bob is negotiated. From the operation 226, control flow advances to an operation 228 where it is determined if the negotiation was successful. If that negotiation was unsuccessful, control proceeds to the operation 224 described above. Alternatively, a successful negotiation will result in control flow advancing to an operation 230.

At the operation 230, a new refund transaction reflective of the agreement stemming from the successful negotiation is created in manner described above. Then, control flow advances to an operation 240 where the new refund transaction is recognized as the current refund transaction.

From the operation 240, control flow advances to an operation 242 where processors of computing devices associated with Alice and Bob may sign the current refund transaction. If so, control flow returns to the operation 222 described above. Alternatively, if the transaction is not so signed, then recognition of the current refund transaction reverts to the previous refund transaction at an operation 244. From the operation 244, control flow returns to the operation 222 described above.

Secret Sharing

As further described below, a threshold secret sharing scheme is employed in the subject matter of the present application.

In some examples, the threshold secret sharing protocol may be defined by a (t; n) threshold, where n may be the number of participating nodes and t+1 may be a minimal number of nodes required to reconstruct a secret. Secret sharing schemes can be examples of threshold crypto systems, where a secret may be divided into portions among n nodes, such that at least t+1 nodes are required to participate in order to reconstruct the secret. Knowledge of any t portions may leave the secret unrevealed.

Shamir Secret Sharing

One example of a threshold secret sharing solution is described in an article entitled "How to share a secret" by Shamir, A. (1979) published in *Communications of the ACM*, 22(11), 612-613 ("Shamir method"). The Shamir method may be based on polynomial interpolation and, without loss of generality, the secret is assumed to be an element of a finite field F. The Shamir method may include a dealer or a dealerless method and may include a set of n nodes $U_1, \ldots, U_n$ and an access structure A. The groups of participants may be able to reconstruct the secret. With the Shamir method, an arbitrary random secret is stored as $f(0)$ in a t degree polynomial $f(x)$ and only participant i can calculate its share $f(x_i)$. If t+1 out of n participants collaborate, they can reconstruct any point on $f(x)$, with their shares (of the key k) $k_1, k_2, \ldots, k_n$ which correspond to $f(x_1)$, $f(x_2), \ldots, f(x_n)$ using Lagrange Polynomial Interpolation. Using the Lagrange Polynomial Interpolation, a function $f(x)$ with degree t can be reconstructed with t+1 points $$p = \{(x_1, f(x_1)), (x_2, f(x_2)), \ldots, (x_{t+1}, f(x_{t+1}))\}$$

$$f(x) = \sum_{i \in p} f(x_i) \prod_{j \in p, j \neq i} \frac{x - x_j}{x_i - x_j} = \sum_{i \in p} f(x_i) b_{i,p}(x)$$

where $$b_{i,p}(x) = \prod_{j \in p, j \neq i} \frac{x - x_j}{x_i - x_j}$$

Note that $b_{i,p}(x_i)=1$ and $b_{i,p}(x_j)=0$.

In the presence of a dealer node, the dealer node may select a secret $a_o=k$, assumed to be an element of the finite field F of size p (p prime), and may randomly pick t−1 positive integers $a_1, \ldots, a_{t-1}$, which represent the coefficient of the polynomial $f(x)=a_o+a_1x+a_2x^2+\ldots$. The dealer node may then compute n points $(x_i, f(x_i))$ belonging to the polynomial and distribute them to the participants.

In the Shamir dealerless shares distribution phase:
1. Each participant $U_i$ is assigned $x_i$ which is known by everyone. Each $x_i$ has to be unique.
2. Each player $U_i$ generates a random polynomial $f_i(x)$ with degree t.
3. Each player $U_i$ secretly sends (encrypted with the recipients' public key) every other player their respective point on the polynomial, $f_i(x_i)$ mod n.
4. Each player $U_i$ sums all their received $f_1(x_i), f_2(x_i), \ldots f_p(x_i)$ (all mod n, where n is the order of the group generated by the point G on the elliptic curve) to form $k_i = f(x_i)$ mod n, which is a share on the polynomial $f(x)$ mod n.

The above description of the Shamir method is one example of a threshold secret sharing solution; however, other methods or threshold secret sharing solutions may be contemplated.

In some implementations, threshold signature calculations may be based on determination of k×G where k is the secret key and G is a point on the Elliptic Curve.

If $f(x)$ is a t-degree polynomial, secret k can be interpolated by $k=\Sigma_{i \in \pi} b_{i,\pi} k_i$ where $\pi$ may be a size t+1 subset of shares $k_a, k_b, \ldots, k_t, k_{t+1}$ and b may be an interpolating factor. $\pi$ may be a group of t+1 nodes collaborating to calculate k×G without revealing its share $k_i$. k may be the x=0 point on a t-degree polynomial Each node $U_i$ may calculate a part $b_{i,\pi} k_i \times G$ All nodes in $\pi$ may add their part together (reconstructing the secret k via Lagrange interpolation) giving:

$$b_{a,\pi} k_a \times G + b_{b,\pi} k_b \times G + \ldots + b_{t+1,\pi} k_{t+1} \times G = k \times G$$

The above described process of calculating Q=kG may be referred to as Secret Share Joining.

Publicly Verifiable Secret Sharing

It may desirable that nodes participating in the subject matter of the present applicable are able to verify the correctness of their secret shares. For keyshare verification, a Publicly Verifiable Secret Sharing (PVSS) protocol or algorithm may be employed. Keyshare verification may allow nodes to verify their own shares as well as the shares of the other nodes.

An example PVSS protocol is described in "Publicly verifiable secret sharing" from the *International Conference on the Theory and Applications of Cryptographic Techniques* (Springer Berlin Heidelberg), pages 190 to 199, by Stadler, M., published May 1996 [Stadler].

In an example PVSS protocol, each node $U_i$ may have a decryption function $D_i$, which is able to access the information encrypted with the corresponding public encryption function $E_i$. In this way, a dealer node may use the public encryption function to distribute keyshares and publish them in the following form:

$$K_i = E_i(k_i), i=1, \ldots, n.$$

The encrypted shares can be publicly verified by an interested node. The nodes can verify its own keyshare(s) and can verify that the other nodes received correct keyshares, i.e. whether the dealer node was honest or not.

The main (high level) components of the PVSS protocol include:
(i) Secret sharing: the dealer node may run an algorithm Share(k)=$(k_1, \ldots, k_n)$ to compute the shares and distribute them among the participating nodes.
(ii) Reconstruction: participant nodes can reconstruct the secret by running the algorithm Recover, such that Recover $(\{D_i(K_i) | i \in A\})=k$.
(iii) Verification: an algorithm PubVerify may be used to validate the encrypted shares. If a node operates the algorithm PubVerify$(\{K_i | i \in A\})=1 \rightarrow$ Recover $(\{D_i(K_i) | i \in A\})=u$ and u=k then the dealer node may be determined to be honest and the keyshares may be consistent.

In some implementations, the PVSS scheme can be interactive or non-interactive depending on necessity in the recovery phase.

Various implementations of the PVSS protocol based on several cryptosystems may be contemplated. For illustration, the following highlights a protocol described in the publication "A simple publicly verifiable secret sharing scheme and its application to electronic voting" from the *Annual International Cryptology Conference* (Springer Berlin Heidelberg), pages 148 to 164, by Schoenmakers, B., published August 1999.

In an initialisation phase, using a public procedure, a group $G_q$ and two independently selected generators G and g may be chosen. Each node, given its private key $x_i \in Z_q^*$, may set $y_i = G^{x_i}$ as public key.

The dealer node may then select a random polynomial $$f(x) = \sum_{j=0}^{t-1} a_j x^j$$

of degree at most t−1 with coefficients in $Z_q$ and sets $a_0=k$. The commitments $C_j = g^{a_j}$, j=0, ..., t and the encrypted shares $f(i)$ (using the participants' public key) $Y_i = y_i^{f(x_i)}$, i=1, ..., n may be published.

By computing $$X_i = \prod_{j=0}^{t-1} (C_j)^{i^j}$$

the dealer node can show that the encrypted shares are consistent. In particular, the dealer node can produce a proof of knowledge of the $f(i)$ by showing that $X_i = g^{f(x_i)}$, $Y_i = y_i^{f(x_i)}$.

The verification of keyshares can be performed using the Fiat-Shamir cryptographic technique in Stadler, cited above. The main steps of the non-interactive protocol include the following:

The prover (every node) may pick a random $w_i \in Z_q$, may compute $a_{1i} = g^{w_i}$, $a_{2i} = y_i^{w_i}$ and may broadcast the values.

Using $c = H(X_i, Y_L, a_{1i}, a_{2i})$ where $H(\ )$ is a cryptographic hash function, the prover (e.g., a node) may compute and broadcast $r_i = w_i - f(x_i)c$.

Given $r_i$, $c$, the verifier node may compute $a_{1i} = g^{r_i} X_i^c$, $a_{2i} y_i^{r_i} Y_i^c$, and may prove that the hash of $X_i$, $Y_i$, $a_{1i} a_{2i}$, $1 \leq i \leq n$, matches c.

When needed, the participant nodes can reconstruct the secret s, without having to learn anything about other nodes' shares $f(x_i)$. The information required may include $S_i = G^{f(x_i)}$, $i=1, \ldots, t$. The secret is computed via Lagrange interpolation $$\prod_{i=1}^{t} S_i^{\lambda_i} = \prod_{i=1}^{t} (G^{f(x_i)})^{\lambda_i} = G^{\sum_{i=1}^{t} f(x_i)\lambda_i} = G^{f(0)} = G^k,$$

where $$b_{i,p}(x) = \prod_{j \in p, j \neq i} \frac{x - x_j}{x_i - x_j}$$

is a Lagrange coefficient.

The above example and the following description of the subject matter of the present application utilizes a dealer node for computing and distributing keyshares. However, it may be contemplated that a dealerless implementation of the secret sharing protocol may be implemented as described by Fiat-Shamir heuristics techniques (see e.g., "Fiat-Shamir heuristic", https://en.wikipedia.org/wiki/Fiat%E2%80%93 Shamir heuristic, accessed Jun. 13, 2018).

Figure 3:
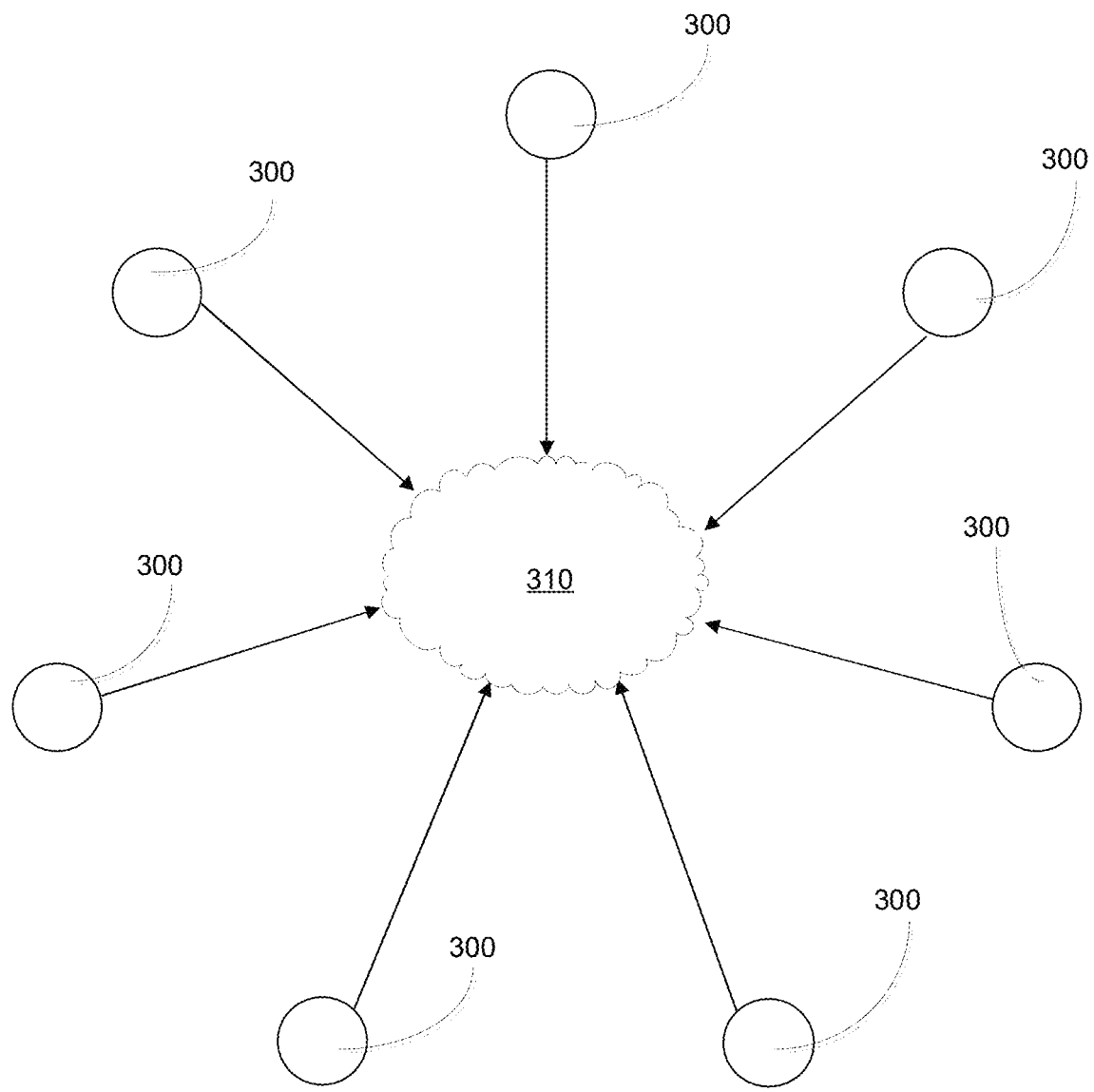
FIG. 3 is a simplified schematic diagram illustrating an example operating environment of the present application.

We now refer to FIG. 3 which shows an example operating environment of the present application. As illustrated, a plurality of nodes 300 are in communication via a computer network 310. Each of the nodes 300 is a computing device and participating in a blockchain and has one or more associated addresses in associated with which the blockchain reflects a quantity of units such as, for example, units of computing resources.

Various ones of the nodes 300 may perform processing steps in distributed processing, the outputs of which combine to form an outcome.

Figure 4:
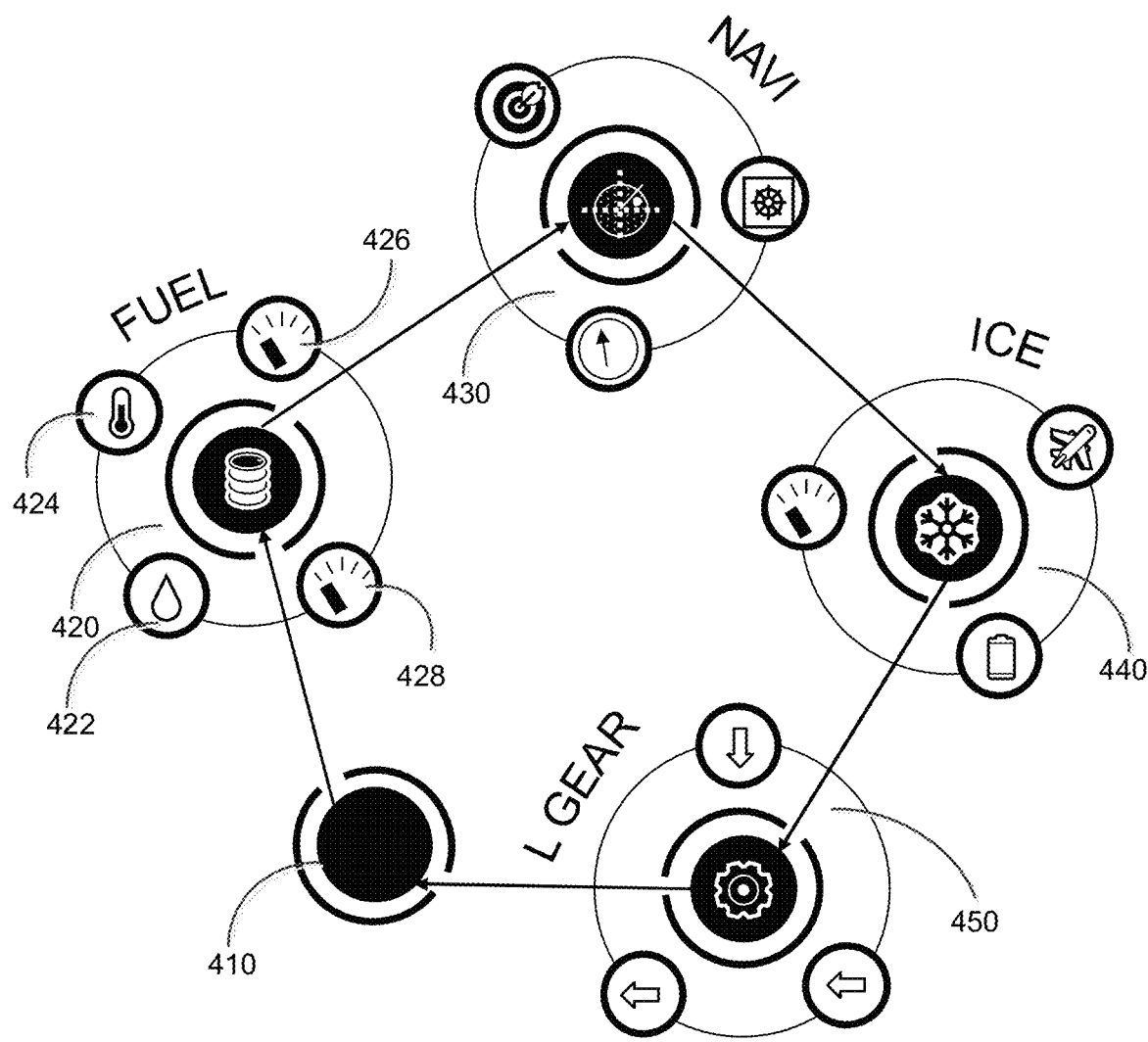
FIG. 4 is a simplified schematic diagram illustrating another example operating environment of the present application.

The subject matter of the present application may be applied in a variety of circumstances. For example, FIG. 4 shows a particular example operating environment of the present application in the context of a system and, more particularly, an aircraft information system 400.

Distributed processing by the aircraft information system 400 is controlled by a controlling computer device 410 and may rely on a plurality of subsystems. For example, distributed processing may involve various nodes such as a fuel subsystem 420, a navigation subsystem 430, a de-icing subsystem 440, and a landing gear subsystem 450. Each of these subsystems may, in turn, include subcomponents. For example, the fuel subsystem 420 may include an oil check subcomponent 422, a temperature subcomponent 424, an oil pressure subcomponent 426, and a fuel volume subcomponent 428. The subsystems may be checked as a part of a pre-flight check in a particular order, and, in turn, the subcomponents of a given subsystem may be checked in a particular order. For example, the subsystems may be checked starting with the fuel subsystem 420 through to the landing gear subsystem 450 in an order denoted by arrows in the drawing. In another example, the subcomponents of the fuel subsystem 420 may be checked starting with the oil check subcomponent 422 clockwise through to the fuel volume subcomponent 428. As further described below, the subject matter of the present application may be employed to control such processing in an ordered fashion. Additionally, it may be that a subsystem may be skipped if circumstances justify such as, for example, the de-icing subsystem 440 may be skipped in a tropical climate. Additionally or alternatively, it may be that if a subsystem fails, the other subsystems may nonetheless be controlled to complete their processing in order.

Figure 5:
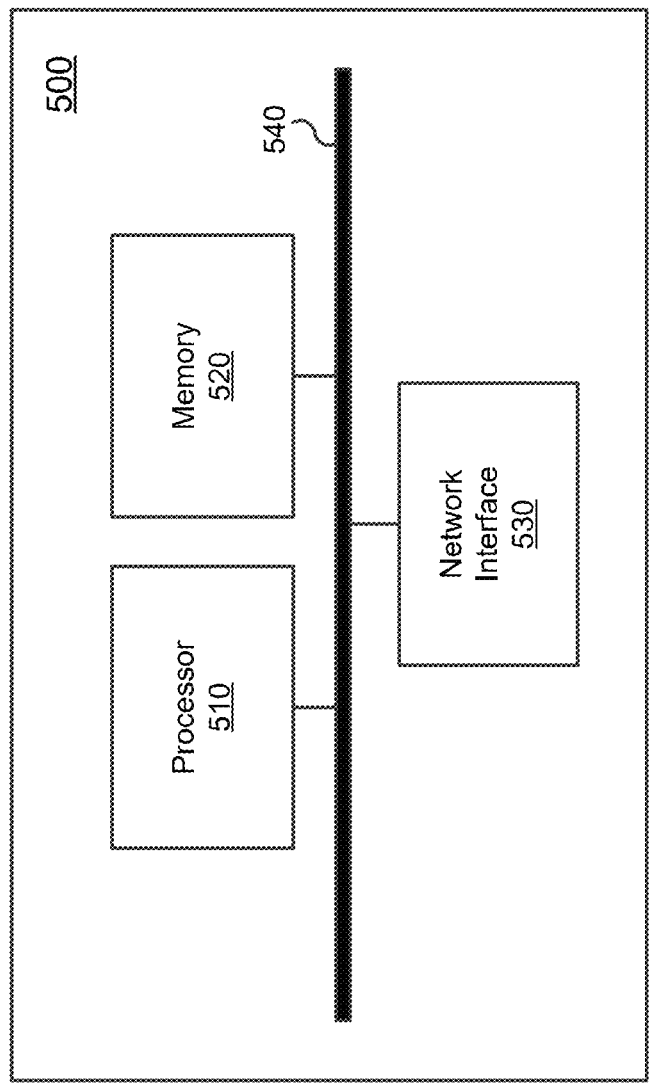
FIG. 5 illustrates an example computing device.

Returning to FIG. 3, recall that each of the nodes 300 is a computing device. FIG. 5 is a high-level operation diagram of an example computing device. Example computing device 500 may be exemplary of one or more of the computer systems described herein including, for example, one or more of the nodes 300. The example computing device 500 includes software that adapts it to perform a particular function.

The example computing device 500 includes a variety of modules. For example, as illustrated, the example computing device 500 may include a processor 510, a memory 520, and a network interface 530. As illustrated, the foregoing components of the example computing device 500 are in communication over a bus 540.

The processor 510 is a hardware processor. The processor 510 may, for example, be one or more ARM, Intel x86, PowerPC processors or the like.

The memory 520 allows data to be stored and retrieved. The memory 520 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 500.

The network interface 530 allows the example computing device 500 to communicate with other computing devices and/or various communications networks such as, for example, the computer network 310 (FIG. 3).

Software comprising instructions is executed by the processor 510 from a computer-readable medium. For example, software may be loaded into random-access memory from persistent storage of the memory 520. Additionally or alternatively, instructions may be executed by the processor 510 directly from read-only memory of the memory 520.

As further described below, software may adapt instances of the example computing device 500 to serve as one or more of the various computer systems mentioned herein, including, for example, one or more of the nodes 300 and/or ones or more of the controlling computer device 410 and/or the subsystems 420-450 and/or the subcomponents thereof.

Figure 6:
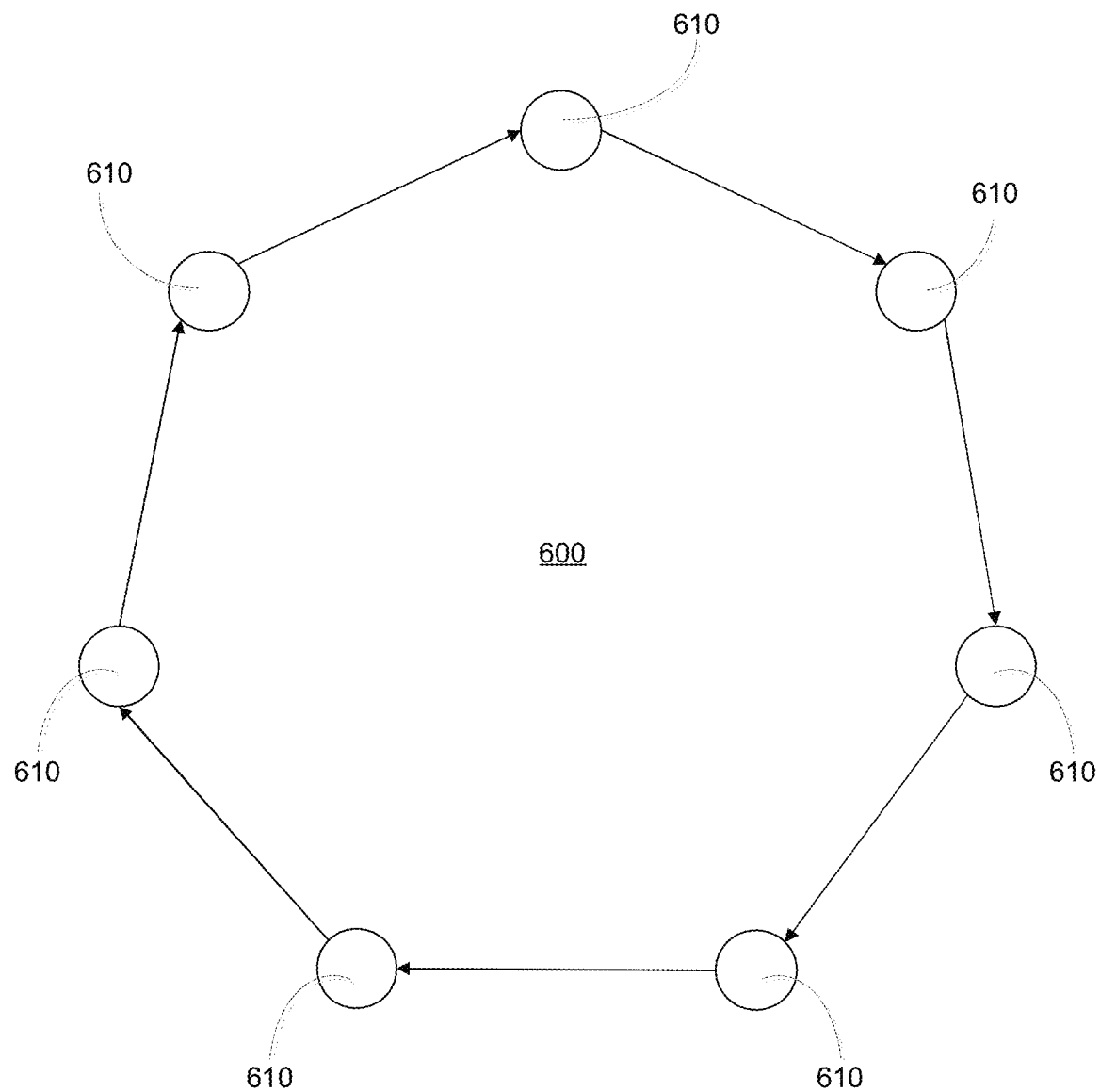
FIG. 6 is a diagram illustrating a cyclically-ordered set constructed of nodes.

Referring to FIG. 6, as further described below, in the protocol described herein, nodes responsible for performing processing steps of an overall distributed computing task may form a cyclically-ordered set 600, ordered in a fashion corresponding to the order of the processing steps in a task.

The cyclically-ordered set may be considered as a ring, with each of the nodes 610 having two other ones of the nodes as an immediately successive node and an immediately previous node to that node. For example, the directed ring may be formed of a cyclically-ordered set of the nodes 610 as shown in FIG. 6.

As further described below, in the subject matter of the present application, more than one such cyclically-ordered set of nodes is employed.

For example, nodes of a cyclically-ordered set of nodes may correspond to processing steps performed by a given subsystem (akin to in the MDD protocol), with multiple such cyclically-ordered sets being employed, each set corresponding to a particular subsystem. Additionally, the relationship between the subsystems and, in particular, the ordering of processing across subsystems may also be represented using another cyclically-ordered set of nodes and, in particular, another cyclically-ordered set of nodes each of which is drawn from a particular one of the cyclically-ordered sets corresponding to a given subsystem.

By way of background, similar cyclically-ordered sets and, in particular, such sets linked by a set of payment channels forming a "circuit" or "group exchange circuits" were discussed in the above mentioned co-owned UK Patent Application Nos. 1706071.6, 1802063.6, and 1806448.5 and featured in the above-mentioned MDD, GRECS and GRELR protocols.

In another example, nodes of a cyclically-ordered set of nodes may be employed to other ends in addition or as an alternative to controlling processing sets, such as, for example, to ends as in or similar to in the GRECS or GRELR protocols, with multiple of such sets being linked into another cyclically-ordered set of nodes formed of nodes each drawn from one of those sets.

Figure 7:
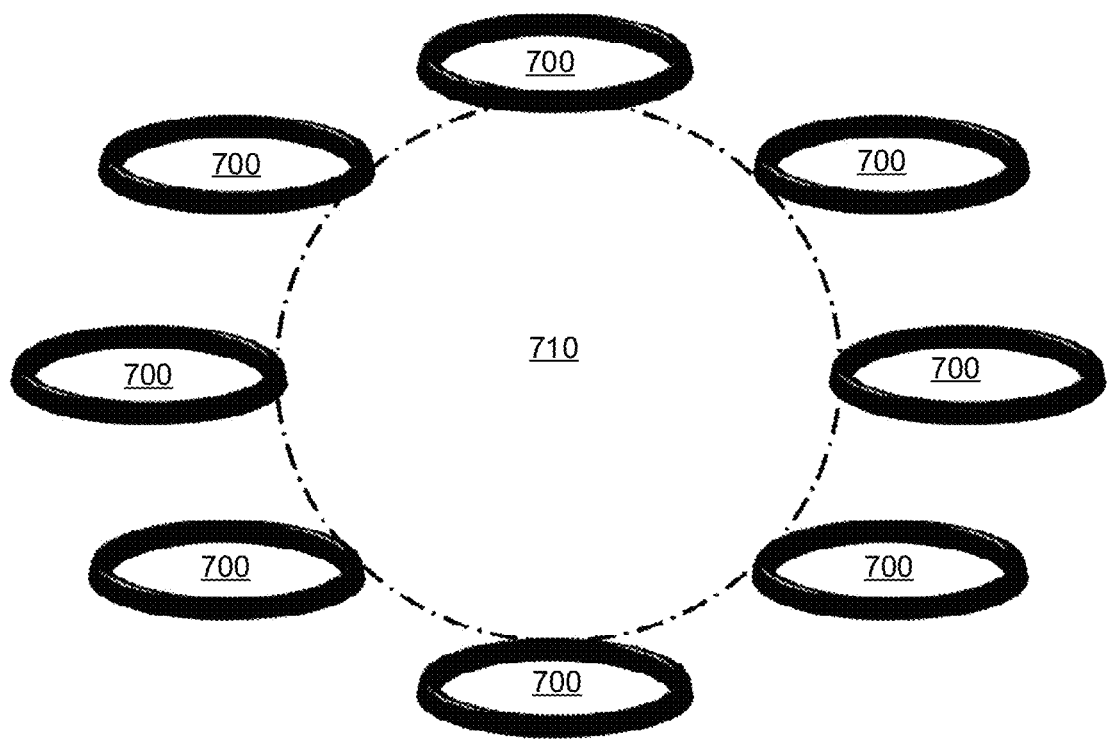
FIG. 7 is a simplified schematic diagram illustrating a two-dimensional structure as may conceptually correspond to a plurality of cyclically-ordered sets.

In any event, such a two-dimensional structure of cyclically-ordered sets of nodes may be visualized as a set of rings 700 joined into an overall ring 710 as shown in FIG. 7. In the simplified schematic representation of FIG. 7, individual nodes forming each of the rings 700 and the overall ring 710 are not shown. Arrows, however, indicate a possible direction of the ordering within each of the cyclically-ordered sets of nodes corresponding to the rings 700 and within the cyclically-ordered set of nodes correspond to the overall ring 710

Figure 8:
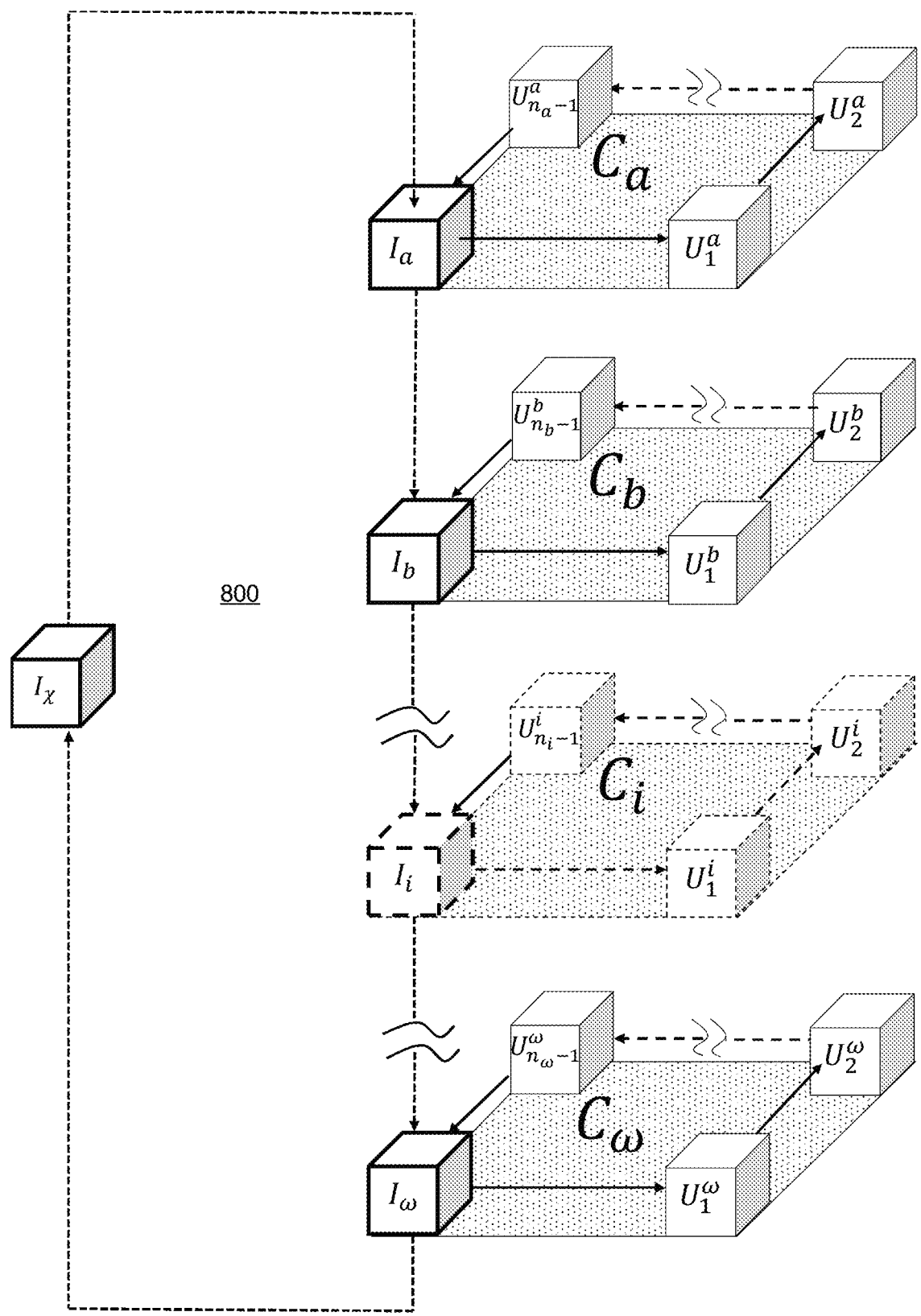
FIG. 8 is a diagram providing a more detailed representation of a two-dimensional structure akin to that shown in FIG. 7.

A more detailed schematic representation of such a two-dimensional structure is shown in FIG. 8.

As illustrated, the two-dimensional structure includes w cyclically-ordered sets $C_a$, $C_b$, ... $C_i$ ... $C_\omega$ such as may correspond, for example, to the rings 700.

Each of the cyclically-ordered sets may, as illustrated, include $n_j$ nodes: an initiator node $I_j$ and n−1 other nodes: $U_1^j$, $U_2^j$, ... $U_i^j$ ... $U_{n_x-1}^j$. It may be that, $n_j$ is different or the same for various of the cyclically-ordered sets $C_j$. Each initiator node $I_j$ serves as supervisor for its respective cyclically-ordered set.

Another cyclically-ordered set, a cyclically-ordered set of initiator nodes 800, is formed of the initiator nodes $I_a$, $I_b$, ... $I_i$ ... $I_\omega$ of each of the cyclically-ordered sets $C_a$, $C_b$, ... $C_i$ ... $C_\omega$ and also a master initiator node $I_M$. As further described below, the master initiator node $L_M$ serves as supervisor for the overall protocol.

As further described below, the subject matter of the present application is reliant on asymmetric cryptographic techniques. Various public key cryptosystems may be employed. For example, elliptic curve cryptography (ECC) may be employed. In a particular example, it may be the elliptic curve cryptography is employed and various private keys and corresponding public keys are employed whereby a given private key k and its corresponding public key P may be an elliptic curve cryptography public-private key pair such that P=kG where G is a base point on an elliptic curve with order q: q×G=0, where q is a large prime number and 0<k<q. In a particular example, the elliptic curve secp256k1—defined in the document "Standards for Efficient Cryptography 2 (SEC 2)", Certicom Corp, Jan. 27, 2010—may be employed. In other words, each public key and its corresponding private key may form an elliptic curve cryptography public-private key pair.

The structures of the payment channels linking the nodes of each of the cyclically-ordered sets of nodes will now be described.

Consider, for example, a given one of the cyclically-ordered sets $C_a$, $C_b$, ... $C_i$ ... $C_\omega$. Simply by way of example, the following discussion will refer to $C_j$ though it is equally applicable to any of the circuits $C_a$, $C_b$, ... $C_i$ ... $C_\omega$. The example cyclically-ordered set $C_j$ is illustrated in schematic drawing 900 of FIG. 9.

Referring to the schematic drawing 900, the nodes of $C_j$—$U_1^j$, $U_2^j$, ..., $U_{n_x-1}^j$ and $I_j$—form an ordered set $\{I_j, U_1^j, U_2^j, ... U_{n_x-1}^j\}$. More particularly, as shown, the nodes are ordered to form a cycle or ring as denoted by the arrows between the nodes.

As shown, keyshares $k_\in^j$, $k_1^j$, $k_2^j$, ..., $k_{n_j-2}^j$, $k_{n_j-1}^j$ are associated with each of the nodes $I_j$, $U_1^j$, $U_2^j$, ... $U_{n_x-1}^j$, respectively. In particular, as further described below, the initiator $I_j$ generates the aforementioned keyshares and then distributes them to the other nodes of the order set. By way of overview, the initiator $I_j$ may generate a private key $v_i$ and then may use a secret sharing protocol to generate the n keyshares—$k_\in^j$, $k_1^j$, $k_2^j$, ..., $k_{n_j-2}^j$, $k_{n_j-1}^j$—and then distribute the shares $k_1^j$, $k_2^j$, ..., $k_{n_j-2}^j$, $k_{n_j-1}^j$ (via some private and secure channel) to the other nodes—i.e., $U_1^j$, $U_2^j$, ..., $U_{n_x-1}^j$, respectively—while retaining the remaining one of the keyshares—i.e., $k_\in^j$—for itself. In some implementations, a publicly verifiable cryptographic secret sharing (PVSS) algorithm may be used.

Notably, where the elliptic curve cryptography (ECC) is employed, the private key $v_i$ may be a random number selected such that $0<v_j<q$. Similarly, it may be that the shares are generated such that they are also suitable for use as ECC private keys, including that $0<k_i^j<q$.

As further described below, the keyshares are used in establishing a circuit of payment channels between the nodes of the cyclically-ordered set $C_j$. In particular, payment channels are established between adjacent ones of the nodes, with those channels being locked and unlocked using values based variously on the keyshares. Payment channels may be created between pairs of nodes joined by arrows. As further described below, these payment channels may be directed to provide for transfers of resources in a direction opposite that indicated by the arrows in FIG. 9.

Figure 10:
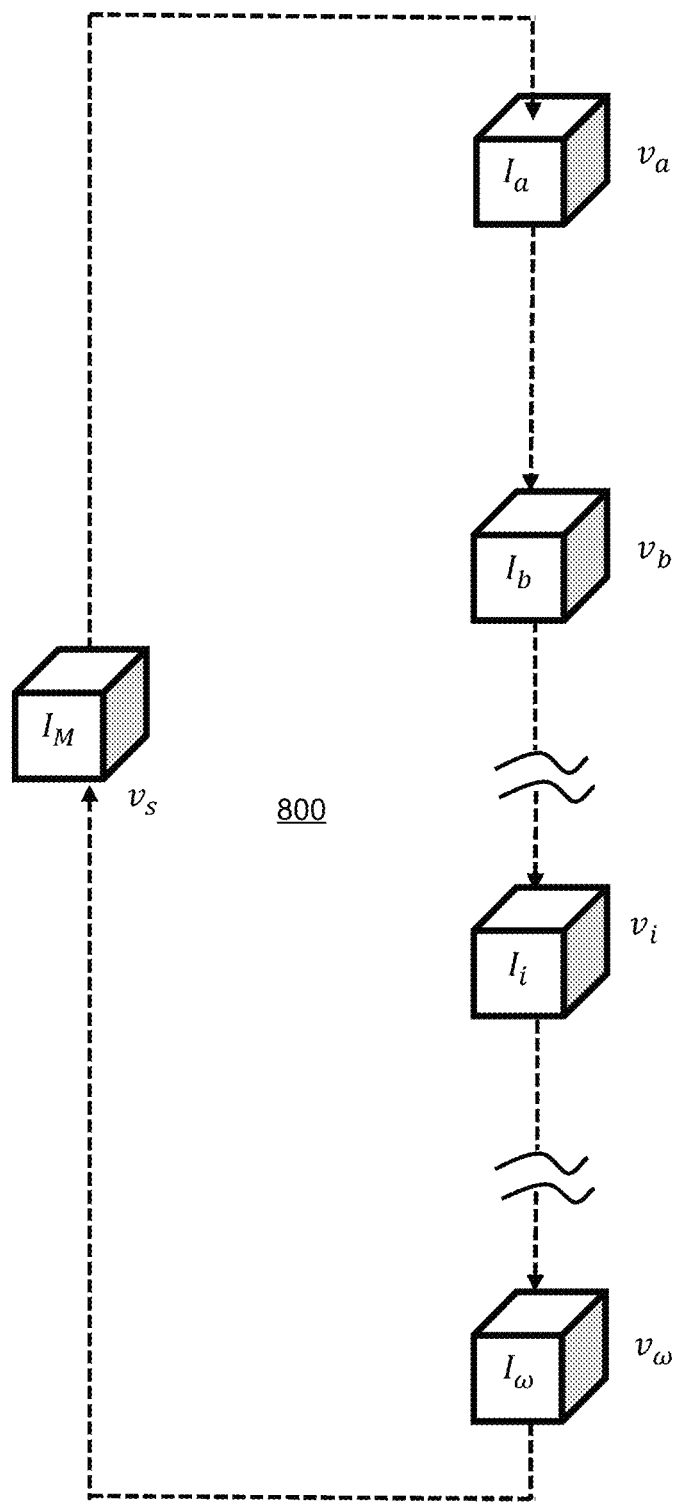
FIG. 10 is a diagram showing a cyclically-ordered set formed of initiator nodes of FIG. 8.

FIG. 10 is a diagram showing the cyclically-ordered set of initiator nodes 800 from FIG. 8. As mentioned above, the cyclically-ordered set of initiator nodes 800 provides the second dimension corresponding to the overall ring 710 (FIG. 7).

As illustrated and as discussed above, the initiator nodes of the cyclically-ordered set of initiator nodes 800 are ordered to form a cycle or ring as denoted by the arrows between the initiator nodes.

As discussed above, each of the initiator nodes $I_a$, $I_b$, ... $I_i$ ... $I_\omega$ will have an associated private key $v_j$. Additionally, as shown, the master initiator IM has an associated private key $v_x$. As further described below, these associated private keys are used in establishing a circuit of payment channels between the nodes of the cyclically-ordered set of initiator nodes 800. In particular, payment channels are established between adjacent ones of the nodes, with those channels being locked and unlocked using values based variously on the private keys associated with the initiator nodes. Payment channels may be created between pairs of nodes joined by arrows. As further described below, these payment channels may be directed to provide for transfers of resources in a direction opposite that indicated by the arrows in FIG. 10.

The creation of the various payment channels will now be described.

As a preliminary matter, it is noted the use of a payment channel requires that units of computing resources be committed to the channel. For example, in a given circuit of payment channels, computing resources will be transferred by each payment channel from a node to its immediately payment channel.

As the transfer of value between nodes may not be a requirement of some applications of the protocol described herein, this amount could be a nominal amount. As will become apparent, however, each node is required to participate in selecting the result under penalty of forfeiture of the value it commits to the payment channel. Accordingly, it may also be that nodes are required to contribute a sufficiently substantial amount of computing resources to the payment channel to discourage frivolous participation and/or violation of the protocol described herein. The quantum of computing resources committed to each of the payment channels may be the same quantum or, put differently, the resource committed to each of the payment channels may be identical where the resources are fungible. Alternatively, these values may vary. For example, it may be that the same quantum of computing resources is committed to each of the payment channels in a given one of several different circuits, but that those values are not identical as between those different circuits.

Further, for clarity of explanation, the following notation is adopted for the discussion of the creation of the payment channels forming a circuit between the initiator nodes of the cyclically-ordered set of initiator nodes and creation of the payment channels forming circuits between the nodes of each of the cyclically-ordered sets $C_a, C_b, \ldots C_i \ldots C_\omega$.

First, the letter i is used as an index relating to the elements (e.g., initiator nodes/each of their respective cyclically-ordered sets) of the cyclically-ordered set of initiator nodes.

Second, the letter j is used as an index relating to the elements (e.g., participants) internal to given one, $C_i$, of cyclically-ordered sets $C_a, C_b, \ldots C_i \ldots C_\omega$.

Next, for an element of a cyclically-ordered set $C_i$ that is described using lower and upper indices, the upper index represents the i value (the set identifier) and the lower index represents the j value internal to the set (component identifier in sequence internal to that cyclically-ordered set). As an example, $k_4^2$ is a private key at index 4 of the cyclically-ordered set $C_2$.

Next, $n_i$ denotes the number of participants in a circuit $C_i$. Notably, $n_i$ includes the initiator $I_i = U_0^i$.

Further, any reference to an index j for a given cyclically-ordered set $C_i$ should be considered modulo $n_i$ meaning that $U_j^i$ should be treated as $U_{j \bmod n_i}^i$. For example, if $n_i = 4$ then $U_4^i = U_{4 \bmod 4}^i = U_0^i$.

Further, the notation used above of $k_\in^i$ referring to the keyshare of the initiator of a cyclically-ordered set $C_i$ may also be rendered as $k_0^i$. This is the keyshare (of $v_i$) associated with the Initiator $I_i$.

Next, it is noted that while there are $\omega$ cyclically-ordered sets (other than the cyclically-ordered set of initiator nodes), there are $\omega+1$ nodes in the cyclically-ordered set of initiator nodes due to the presence of the master initiator $I_M$ (which may also be referred to as $I_0$).

Further, any reference to an index i for the cyclically-ordered set of initiator nodes should be considered modulo $(\omega+1)$, meaning that, as an example, $I_i = I_{i \bmod (\omega+1)}$. Therefore, if $\omega=4$ then $I_{4+1} = I_{5 \bmod 5} = I_0 = I_M$.

Next, it is noted that any reference to the cyclically-ordered set of initiator nodes may use letter subscripts (a, b, c, d . . . ) as, for example, in FIGS. 8 and 10 or, alternatively, may equivalently use numerical corresponding indices (0, 1, 2, 3 . . . ). For example, the latter may be used in referring to iteration across the cyclically-ordered set of initiator nodes.

Figure 9:
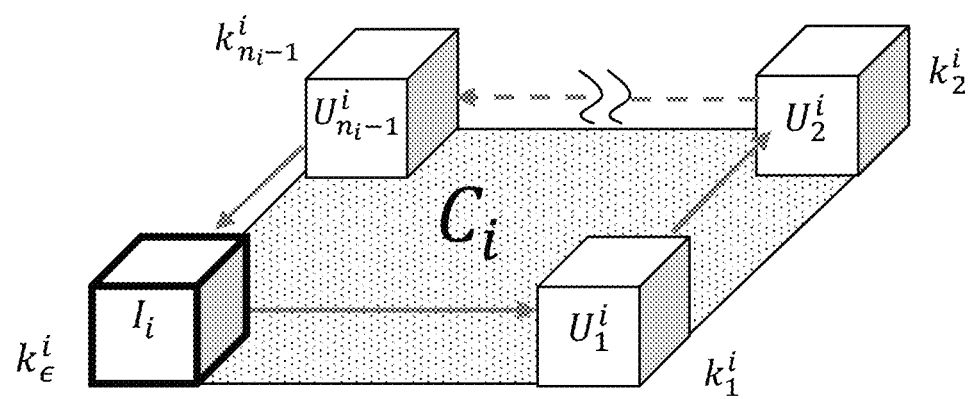
FIG. 9 is a diagram showing a typical one of the cyclically-ordered sets of FIG. 8.

Finally, it is noted that, in the following description, the terms immediately previous and immediately subsequent are used and correspond to the directions of the arrows shown in FIGS. 8, 9 and 10. For example, the node labelled $I_a$ in FIG. 8 would be considered the node immediately previous the node $I_b$ and the node labelled $I_b$ would be the considered the node immediately subsequent the node $I_a$.

Figure 11:
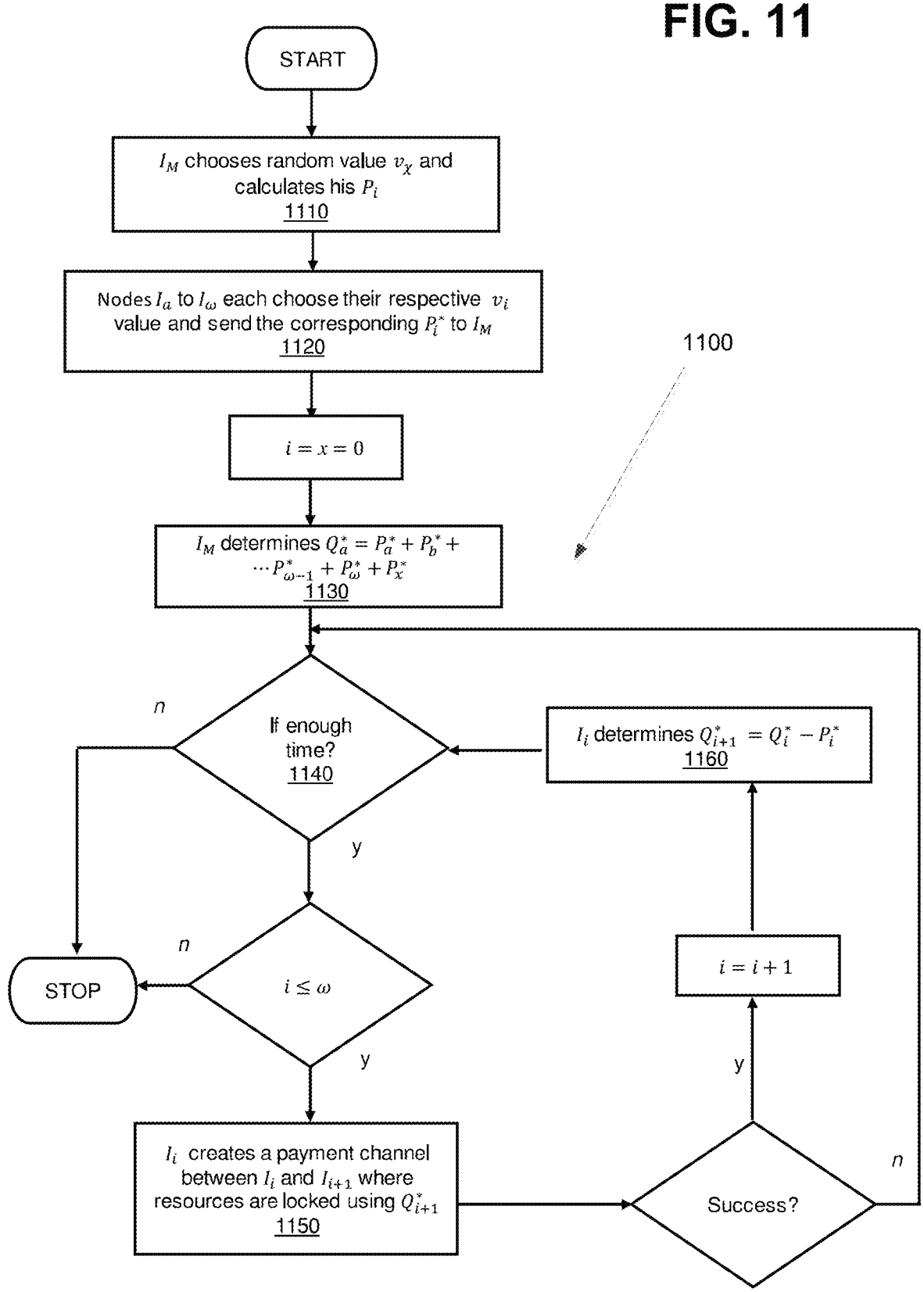
FIG. 11 is a flowchart showing operations for construction of payment channels forming a circuit between the initiator nodes.
Figure 12:
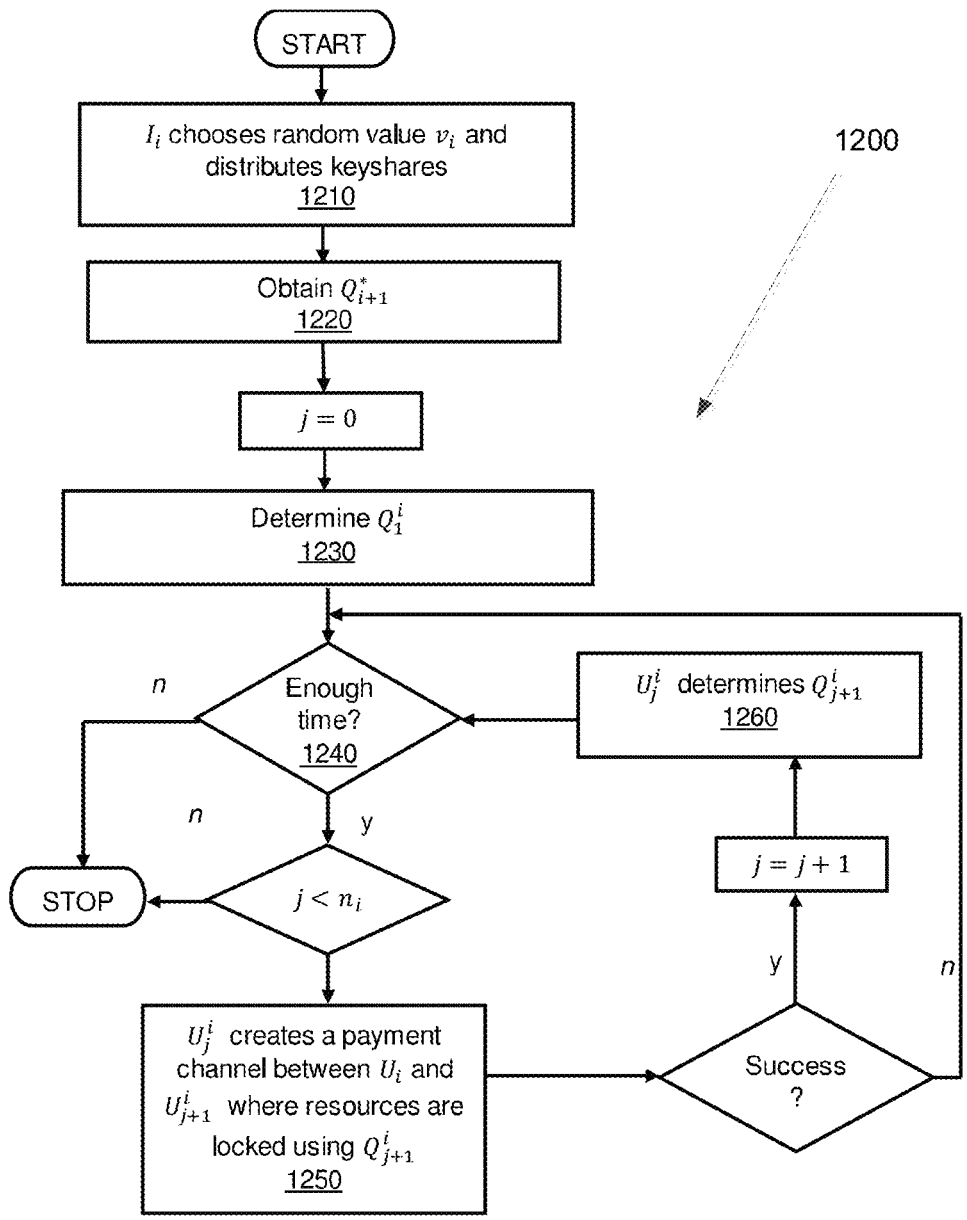
FIG. 12 is a flowchart showing operations for construction of payment channels forming a circuit between the nodes of a given cyclically-ordered set of nodes.
Figure 14:
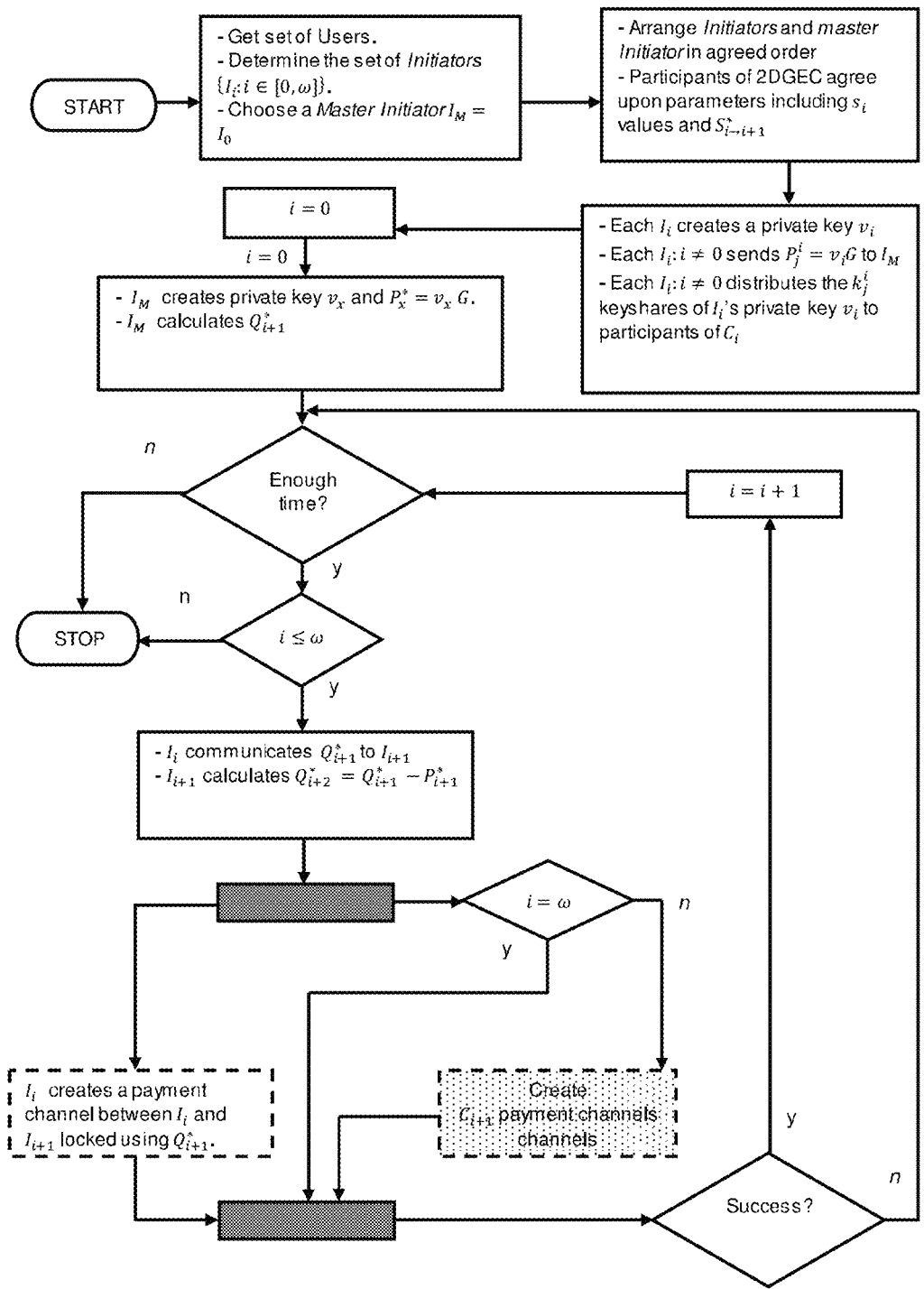
FIG. 14 is a flowchart showing how the operations in the flowcharts of FIGS. 11 and 12 may be combined.

Example operations performed by nodes participating in the protocol described herein will now be discussed with reference to a series of flowcharts presented in FIGS. 11, 12 and 14.

First, the construction of payment channels forming a circuit between the initiator nodes will be discussed with reference to FIG. 11. FIG. 11 shows a flowchart 1100 illustrating operations performed by initiator nodes of the cyclically-ordered set of initiator nodes in carrying out operations in preparing to create a circuit of payment channels. Operations 1110 and onward are performed by one or more processors each of various of the initiator nodes. As such, operations 1110 and onward are performed by one or more processors of various computing devices, such as, for example, the processor 510 (FIG. 5) of a suitably configured instance of the example computing device 500 executing software comprising computer-executable instructions as may be stored on a computer-readable storage medium such as for, example, storage of the memory 520.

At the operation 1110, the master initiator node $I_M$ generates the private key $v_x$ mentioned above.

Notably, this value is central to the security of the protocol and, in particular, to the security of cyclically-ordered set of initiator nodes as is known only to the master initiator node $I_M$. The value $v_x$ is maintained as secret at least until all the payment channels forming circuits between each of the cyclically-ordered sets are formed.

Additionally at the operation 1110, the master initiator node $I_M$ generates a public key $P_x^*$ corresponding to the private key $v_x$. For example, where elliptic key cryptography is employed, the master initiator node $I_M$ may compute $P_x^* = v_x G$.

Next, at an operation 1120, each of the other initiator nodes ($i_a$, to $I_\omega$) generate their respective private keys $v_i$. Additionally, each generates a corresponding public key $P_i^*$ and sends that value to the master initiator node $I_M$. For example, where elliptic key cryptography is employed, each of the initiator nodes may compute $P_i^* = v_i G$ for its respective $v_i$.

Next, at an operation 1130, master initiator node LAI combines the received $P_i^*$ values along with its own associated $P_x^*$ to generate a value $Q_A^*$. For example, where ECC is employed, it may sum the values $Q_A^* = P_a^* + P_b^* + \ldots P_{\omega-1}^* + P_\omega^* + P_x^*$.

As described below, a payment channel will be generated between $I_M$ and $I_a$ in favour of $I_a$—i.e., $I_M \to I_a$—having a $T_{Pay}$ transaction is "locked" with the value $Q_A^*$, meaning that a corresponding private key $SV_A$ to $Q_A^*$ (and not a signature using that key) must be supplied to unlock the $T_{Pay}$. Notably, due to the definition of $Q_A^*$, the unlocking value $SV_A$ to unlock that $T_{Pay}$ transaction would be based on the private keys associated with all of the initiator nodes. For example, where ECC is employed, the secret value $SV_A$ corresponding to $Q_A^*$ can be related to $Q_A^*$ as follows. First, recall that according to the homomorphic property of elliptic curve addition, $E(m+n)=E(m)+E(n)$, where E is the function $E(x)=xG$. As such, the private key $SV_A$ corresponding to $Q_A^*$ is the sum of the private keys $v_a+v_b+ \ldots v_{\omega-1}+v_\omega+v_x$.

Iteration is required to establish the payment channels. Iteration starts at I=0 and, therefore, at the master initiator node (recall that $I_M=I_0$).

Next, at the operation 1140, it is determined whether sufficient time remains for completing set-up of the payment channels. Manners of determining whether sufficient time remains for completing set-up of payment channels are further described below. If it is determined that sufficient time does not remain, set up terminates (and the refund transactions of any payment channels that were established will occur due to timeout).

If sufficient time remains, then following the operation 1140, it is determined whether all of the payment channels have been created between the initiator nodes. If so, set up terminates as completed. Alternatively, if there are still payment channels that need to be created so as to form the circuit amongst the nodes of the cyclically-ordered set of initiator nodes, then the next operation is an operation 1150.

At the operation 1150, the node $I_i$ creates a payment channel between $I_i$ and $I_{i+1}$ locking resources using a locking value $Q_{i+1}^*$. For example, where I=0, the above-described payment channel $I_M \to I_a$ will be created locked by $Q_A^*$.

From the operation 1150, if the payment channel was created successfully, then the notional iterator I is incremented and an operation 1160 is next. Alternatively, if there was a failure, the next operation is the operation 1140 whereby creation of the payment channel can be retried so long as sufficient time remains.

At the operation 1160, the node $I_i$ will determine the next locking value based on the locking value used to lock the last payment channel and the public key $P_i^*$ corresponding to its private key $SV_i$. For example, where ECC is employed it may compute $Q_{i+1}^*=Q_i^*-P_i^*$ (where $Q_i^*$ now refers to the previous locking value due to increment of the iterator i).

From the operation 1160, the next operation is operation 1140 whereby another payment channel will be created (as needed) so long as sufficient time remains (and it can be successfully created).

Notably, in the above process, each initiator node other than the master initiator node $I_M$ benefits from creation of the payment channel in its favour before the payment channel into which it supplies resources is created. Conveniently, in this way, the initiator nodes are freed from risk of another initiator node misappropriating resources (without a need to trust the master initiator node). Notably, $I_M$ does not require that such ordering is provided for its benefit as it is the sole node In possession of $v_x$ upon which all the locking values are based.

First, the construction of payment channels forming a circuit between the nodes of a given cyclically-ordered set of nodes $C_i$ will be discussed with reference to FIG. 12. FIG. 12 shows a flowchart 1200 illustrating operations performed by nodes of a typical cyclically-ordered set of initiator nodes $C_i$ in carrying out operations in preparing to create a circuit of payment channels between each pair of adjacent nodes in the set. Operations 1210 and onward are performed by one or more processors each of various of the Initiator nodes. As such, operations 1210 and onward are performed by one or more processors of various computing devices, such as, for example, the processor 510 (FIG. 5) of a suitably configured instance of the example computing device 500 executing software comprising computer-executable instructions as may be stored on a computer-readable storage medium such as for, example, storage of the memory 520.

First, at the operation 1210, the initiator node $I_i$ of the cyclically-ordered set of nodes $C_i$ generates the private key $v_i$ and distributes key shares thereof, $k_\in^i, k_1^i, k_2^i, \ldots, 1_{n_i-2}^i, k_{n_i-1}^i$, in manners as described above.

Next, at an operation 1220, the initiator node $I_i$ obtains the locking value $Q_{i+1}^*$. The $Q_{i+1}^*$ may be obtained from the next initiator node in the cyclically-ordered set of initiator nodes. For example, the value $Q_{i+1}^*$ may be received from the initiator node $I_{i+1}$ of the next cyclically-ordered set of nodes $C_{i+1}$.

Next, at an operation 1230, the initiator node L determines a locking value based on the keyshares and $Q_{i+1}^*$. In particular, it determines a public key corresponding to each keyshare when treated as a private key. For example, in the case of $k_\in^i$, where ECC is employed, $I_i$ may compute $P_\in^i \to k_\in^i G$. Notably, each of the other nodes of the cyclically-ordered set of nodes $C_i$ will also be able to determine the public key corresponding to its keyshare in a similar manner.

The initiator node $I_i$ then determines a locking value $Q_1^i$ based on the public keys corresponding to the key shares and on $Q_{i+1}^*$. For example, where ECC is employed, it may sum the values $Q_1^i=P_1^i+P_2^i+ \ldots +P_{n_i-2}^i+P_{n_i-1}^i+P_\in^i+Q_{i+1}^*$.

As described below, a payment channel will be generated between $I_j$ and $U_1^i$ in favour of $U_1^i$—i.e., $U_0^i \to U_1^i$ having a $T_{Pay}$ transaction is "locked" with the value $Q_1^i$, meaning that a corresponding private key $sv_1$ to $Q_1^i$ (not a signature using that key) must be supplied to unlock the $T_{Pay}$. Notably, due to the definition of $Q_1^i$, the unlocking value $sv_1$ to unlock that $T_{Pay}$ transaction would be based on the key shares associated with each of the nodes of $C_i$ (and also on $Q_{i+1}^*$). For example, where ECC is employed, the secret value $sv_1^i$ corresponding to $Q_1^i$ can be related to $Q_1^i$ by way of the homomorphic property explained above. As such, the private key $sv_1^i$ corresponding to $Q_1^i$ is the sum of the aforementioned keyshares and $SV_{i+1}$—i.e., $Q_{i+1}^*$—i.e., $k_1^i+k_2^i+ \ldots +k_{n_i-2}^i+k_{n_i-1}^i+k_\in^i+SV_{i+1}$.

Iteration is required to establish the payment channels. Iteration starts at j=0 and, therefore, at the initiator node (recall that $I_i=U_j^i$).

Next, at an operation 1240, it is determined whether sufficient time remains for completing set-up of the payment channels. Manners of determining whether sufficient time remains for completing set-up of payment channels are further described below.

If it is determined that sufficient time does not remain, set up terminates (and the refund transactions of any payment channels that were established will occur due to timeout).

Alternatively, if sufficient time remains, then following the operation 1240, it is determined whether all of the payment channels have been created between the nodes of $C_i$. If so, set up of payment channels for that cyclically-ordered set terminates as completed. Alternatively, if there are still payment channels that need to be created in order to form the circuit amongst the nodes of that cyclically-ordered set, then the next operation is an operation 1250.

At the operation 1250, the node $U_j^i$ creates a payment channel between $U_i$ and $U_{j+1}^i$ locking resources using a locking value $Q_{j+1}^i$. For example, where j=0, the above-described payment channel $I_j \rightarrow U_1^i$ will be created locked by $Q_1^j$.

From the operation 1250, if the payment channel was created successfully, then the notional iterator j is incremented and an operation 1260 is next. Alternatively, if there was a failure, the next operation is the operation 1240 whereby creation of the payment channel can be retried so long as sufficient time remains.

At the operation 1260, the node $U_j^i$ will determine the next locking value based on the locking value used to lock the last payment channel and the public key $P_j^i$ corresponding to its key share $k_j^i$. For example, where ECC is employed it may compute $Q_{j+1}^i = Q_j^i - P_j^i$ (where $Q_j^i$ now refers to the previous locking value due to increment of the iterator j).

From the operation 1260, the next operation is operation 1240 whereby another payment channel will be created (as needed) so long as sufficient time remains (and it can be successfully created).

Figure 13:
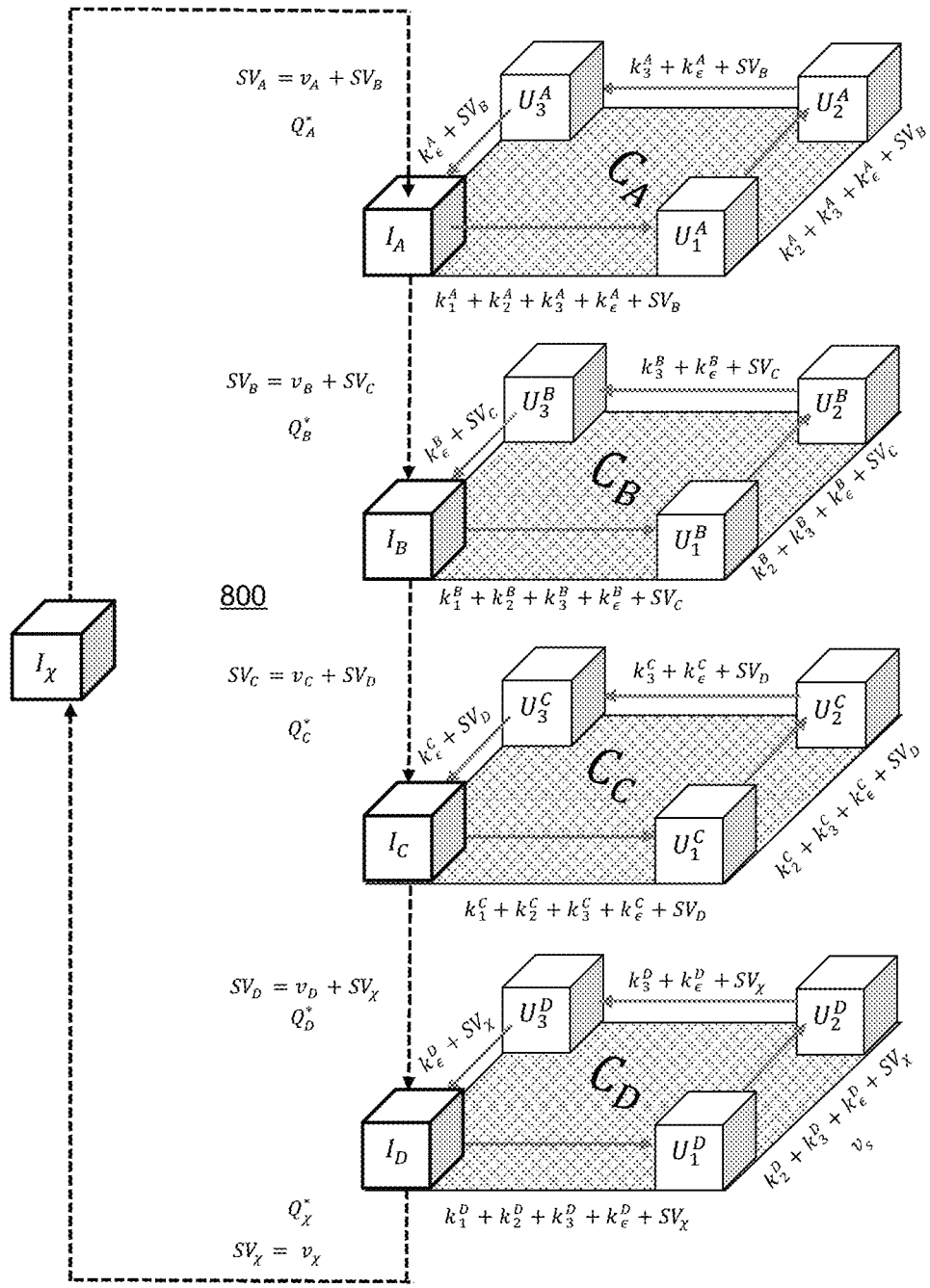
FIG. 13 provides a version of the diagram of FIG. 8 annotated to show unlocking values as may be associated with payment channels between nodes.

FIG. 13 provides a version of FIG. 8 annotated to show unlocking values as may be associated with payment channels between nodes established in accordance with the foregoing.

Finally, it is noted the operations depicted in the flowchart 1100 and the flowchart 1200 are necessarily interdependent due to the common values employed and generated various of the operations. FIG. 14 provides a flowchart 1400 illustrating how the operations in the flowchart 1100 and the flowchart 1200 may be combined. Notably, the operations in the flowchart 1400 depicted with a stippled border may proceed in parallel. Additionally, it is noted that the operation that is shown with a shaded fill corresponds to the various operations of the flowchart 1200.

Commitment Channel

As further described below, the subject matter of the present application does not require the use of a payment channel for more than one payment iteration. Indeed, the primary focus of the channels is not payments per se. Rather, the payment channels serve as an escrow mechanism to enforce compliance with the protocol described herein. As such, it is possible to employ a version of a payment channel that may differ from the above-mentioned existing payment channels as the emphasis in this different version of payment channels may be on escrowing resources and providing a time-locked refund transaction, rather than providing for multiple iterations of refund-payment transactions. Such a variation of a payment channel may be referred to as a commitment channel.

A commitment channel is a 'one-way' channel in that transfer of resources is in one direction only, similar to the example implementation of a payment channel described above. For a pair of nodes, a commitment channel such that $U_A$ pays $U_B$ may be represented by the notation $U_A \rightarrow U_B$.

Figure 15:
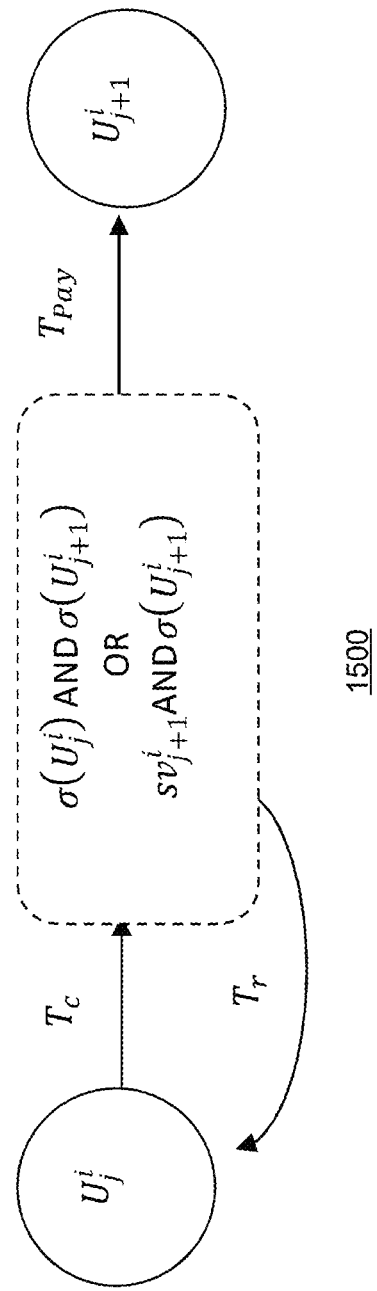
FIG. 15 provides a representation of a commitment channel version of a payment channel.

FIG. 15 provides a representation 1500 of a UA UB commitment channel.

As illustrated, the commitment channel includes three transactions, $T_c$, $T_{Pay}$, and $T_r$. Note that the notation $\sigma(U_x)$ represents the cryptographic signature of $U_x$.

The $T_c$ transaction represents the commitment component of the payment channel. Here, through the transaction, $U_b$ sends/commits a specified number of units to be governed by either: a 2-of-2 multi-signature ($U_j^I$ and $U_{j+1}^i$) or knowledge of a secret value $sv_{j+1}^I$ and the cryptographic signature of $U_{j+1}^i$.

The $T_r$ transaction represents a refund of the specified number of units (from the commitment transaction) back to $U_b$ that becomes eligible for submission to the blockchain after a specified time has expired. As such, $T_r$ is arranged to return control of a resource to a particular node, $U_b$, upon satisfaction of the return condition of time expiry. For this transaction to be executed successfully it requires the cryptographic signatures of $U_A$ and $U_B$.

The $T_{Pay}$ transaction is the transfer of the specified number of units from committed funds of $U_b$ to $U_a$ (i.e., from a source address associated with $U_b$ to a destination address associate with $U_a$). For this transaction to be executed successfully it requires the secret value $sv_{j+1}^I$ and the cryptographic signature of $U_B$. In other words, the transaction will only execute responsive to satisfaction of an execution condition including supply of the required value(s) including the unlocking value.

An implementation of a commitment channel may be provided using the Bitcoin blockchain. In such an implementation, each of $T_c$, $T_r$ and $T_{Pay}$ may be Bitcoin transactions. Corresponding Bitcoin transactions 1600, 1700 and 1800 are shown in FIGS. 16, 17 and 18, respectively. Notably, one or more of the transactions 1600, 1700, 1800 may employ a non-standard opcode OP_ECPMULT. OP_ECPMULT takes an encoded Elliptic Curve Point and a number and performs Elliptic Curve Multiplication by Scalar, outputting the result as an encoded Elliptic Curve Point. Details of the OP_ECPMULT opcode are provided in co-owned UK Patent Application No. 1705749.8 entitled "Computer-Implemented System and Method", filed 10 Apr. 2017.

FIG. 19 provides a table 1900 showing how the <scriptPubKey> of the commitment transaction 1600 may be combined with the <scriptSig> of the payment transaction 1800 using the opcode OP_ECPMULT to unlock the committed resources (Bitcoin).

Sufficient Time Remaining

Manners of determining whether there is sufficient time remaining for creating payment channels will now be discussed as regards payment channels.

Considering the scenario where the payment channels are commitment channels, central to this sufficient or 'enough time' notion is that when a pair of participants are creating a payment channel $U_A \rightarrow U_B$ they must ensure that they consider that:

1. Each commitment channel has an nTimeLocked refund transaction $T_r$ that the participant $U_A$ may submit to the blockchain, returning the escrowed funds of the commitment channel back to $U_A$ if $U_A$ is not satisfied that certain conditions have been met;
2. Each participant $U_A$ must be given a 'fair' or an 'agreed-upon' time period to construct the channel $U_A \rightarrow U_B$ and collect their funds;
3. There may be other commitment channels that need to be created after $U_A \rightarrow U_B$ itself is created. This may include:
   a) commitment channels in the circuit for the same cyclically-ordered set $C_i$,
   b) commitment channels in circuits associated with other cyclically-ordered sets where $C_k$:k>i, and
   c) commitment channels $U_e \rightarrow U_f$ in the circuit associated with the cyclically-ordered set of initiators where $C_k$:e>A; and
4. There is an expected and agreed-upon time $T_{2D}$ when the Master Initiator $I_M$ submits the first $T_{Pay}$ transaction to the blockchain (in the process revealing $SV_x = v_x$).

Note also that, if something goes wrong before starting time $T_{2D}$ (including not all required channels being created), a participant $U_b$ wants to ensure that they have enough time to:
- a) submit the refund $T_r$ from the commitment channel $U_b \rightarrow U_c$; or
- b) submit the payment $T_{Pay}$ from the commitment channel $U_a \rightarrow U_b$, assuming that $U_c$ had similarly submitted the payment $T_{Pay}$ from the commitment channel $U_b \rightarrow U_c$.

Given the consideration of these scenarios due to the planned starting time $T_{2D}$, determining whether "enough time" remains must take into consideration whether there is enough time left for each node of a cyclically-ordered set $C_i$ (or the cyclically-ordered set of initiator nodes) to have an opportunity to create their channel and receive a refund.

To this end, values $s_i$ and $S_{i \rightarrow i+1}^*$ may be defined as follows.

$s_i$ represents the amount of time each $U_j^i$ is given to:
1. construct the commitment channel $U_j^i \rightarrow U_{j+1}^i$.
2. determine a necessary secret value found within the blockchain, and
3. and submit the transaction $T_{Pay}$ that pays $U_{j+1}^i$ to the blockchain network.

$s_i$ may be expressed in units such as, for example, seconds or number of blocks.

$S_{i \rightarrow i+1}^*$ represents the amount of time a given initiator is provided to create commitment channel $I_i \rightarrow I_{i+1}$. $S_{i \rightarrow i+1}^*$ value is to be of sufficient size so that:
1. all the commitment channels $U_j^{i+1} \rightarrow U_{j+1}^{i+1}$ of the circuit associated with the cyclically-ordered set $C_{i+1}$ can be constructed,
2. all the necessary secret values of the commitment channels of the circuit associated with the cyclically-ordered set $C_{i+1}$ can be found within the blockchain,
3. all the $T_{Pay}$ transactions of the circuit $C_{i+1}$ may be submitted to the blockchain,
4. the commitment channels $I_i \rightarrow I_{i+1}$ of the circuit associated with the cyclically-ordered set of initiator nodes can be constructed,
5. the necessary secret value of the commitment channel $I_i \rightarrow I_{i+1}$ can be found within the blockchain, and
6. the $T_{Pay}$ transaction of the $I_{i-1} \rightarrow I_i$ may be submitted to the Bitcoin network.

Notably, the selection of the value of $S_{i \rightarrow i+1}^*$ may take into account that one or more of the above operations may occur in parallel.

$S_{i \rightarrow i+1}^*$ may be expressed in units such as, for example, seconds or number of blocks.

With the values $s_i$ and $S_{i \rightarrow i+1}^*$ defined as set-out above, the conditions for assessing whether enough time remains may correspond to $T_{2D}$-current time$>f(\{s_i: i \in [a, \omega]\})$ or $T_{2D}$-current time$>f(\{S_{i \rightarrow i+1}^*: i \in [a, \omega]\})$, as applicable.

The above explains how circuits of payment channels may be established for the various cyclically-ordered sets. The use of those circuits in controlling the ordering processing of the components of the system (e.g., between subsystems corresponding to each of the $\omega$ cyclically-ordered sets of nodes $C_a, C_b, \ldots C_i \ldots C_\omega$) and within the subcomponents of those components (e.g., between subcomponents corresponding to each of the nodes of the $\omega$ cyclically-ordered sets $C_a, C_b, \ldots C_i \ldots C_\omega$) will now be described with reference to FIG. 20.

Figure 20:
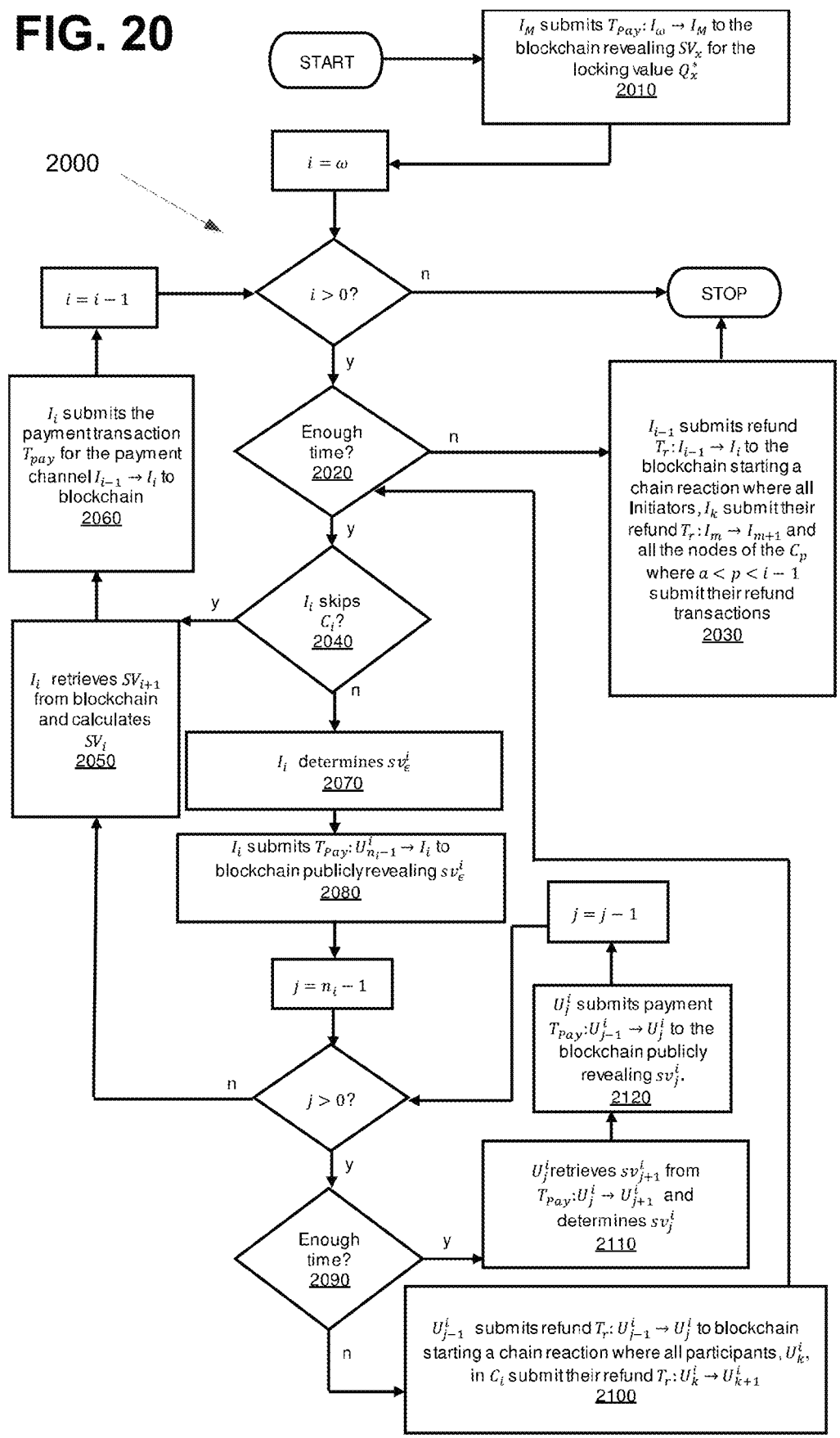
FIG. 20 is a flowchart showing operations performed by nodes of various of the cyclically-ordered sets in controlling and carrying out ordered processing.

FIG. 20 shows a flowchart 2000 illustrating operations performed by nodes of various of the cyclically-ordered sets in carrying out operations for controlling the ordering of processing between the various cyclically-ordered sets of nodes and amongst the nodes making up each set. Operations 2010 and onward are performed by one or more processors each of various of the nodes. As such, operations 2010 and onward are performed by one or more processors of various computing devices, such as, for example, the processor 510 (FIG. 5) of a suitably configured instance of the example computing device 500 executing software comprising computer-executable instructions as may be stored on a computer-readable storage medium such as for, example, storage of the memory 520.

The operations illustrated in FIG. 20 presume that payment channels have been established to form circuits between the nodes of each of the cyclically-ordered sets of nodes (including the cyclically-ordered set of initiator nodes).

In considering FIG. 20 it may be helpful for the reader to refer to FIG. 8 or FIG. 13, keeping in mind that in the example illustrated in those figures there are four cyclically-ordered sets other than the cyclically-ordered set of initiator nodes—i.e., $\omega = d = 4$—and each of those four cyclically-ordered sets includes exactly four nodes—i.e., $n_i = 4 \forall i \in [1, d]$. It is noted that according to the representation of the various cyclically-ordered sets of nodes in FIGS. 8 and 13, the execution of payment channels between those nodes and, therefore, the consequent triggering of processing by those nodes, proceeds in an anti-clockwise direction.

At the operation 2010, the master initiator LAI submits the transaction $T_{pay}$ of the payment channel in its favour ($I_\omega \rightarrow I_M$). Notably, because of how the payment channels are constructed, $T_{Pay}$ of that channel will be locked with a locking value $Q_x^*$ and unlocked by a corresponding unlocking value $SV_x$ (the locking values being private keys corresponding to the public keys of the unlocking values) and both $Q_x^*$ and $SV_x$ are based on $v_x$. (Recall that $v_x$ was known only to $I_M$ up until this point.) Notably, this has the effect of revealing $v_x$ on the blockchain as $T_{Pay}$ is submitted.

The value of $SV_x$ will be required by $I_\omega$ to unlock the $T_{Pay}$ transaction in its favour. In some implementations $I_M$ may transmit $SV_x$ to $I_\omega$. Additionally or alternatively, $I_\omega$ may retrieve $SV_x$ from the blockchain.

Iteration is required so that processing may proceed across the subsystems (and, therefore, through the nodes of the cyclically-ordered set corresponding to that subsystem as triggered by the initiator of that cyclically ordered sets). Iteration starts at $i = \omega$ and, therefore, at the initiator node $I_\omega$ of the cyclically-ordered set of nodes $C_\omega$.

Next, at an operation 2020, it is determined whether sufficient time remains for completing the submission of the payment channels of the circuits associated with the cyclically-ordered sets of nodes (other than the cyclically-ordered set of initiator nodes) that have not yet completed processing and, also, whether sufficient time remains for completing the submission of the remaining payment channels of the circuit associated with the cyclically-ordered set of initiator nodes.

If it is determined that sufficient time does not remain, processing proceeds to an operation 2030 where the initiator node $I_{i-1}$ submits the refund transaction of the payment channel it created (i.e., $T_r: I_{i-1} \rightarrow I_i$) to the blockchain. Notably, this will have the effect of triggering a chain reaction whereby all of the other initiator nodes in the cyclically-ordered set of initiator nodes similarly submit refund transactions in their favour. This will also have the effect of having the nodes of the cyclically-ordered sets that have not yet executed submit the refund transactions in their favour.

Alternatively, if it is determined at the operation 2020 that sufficient time does remain, processing proceeds to an operation 2040.

At the operation 2040, the initiator node $I_i$ determines whether the processing associated with the cyclically-ordered set of (non-initiator) nodes to which it belongs, $C_i$, should proceed. Such a determination may, for example, be based on circumstances of the particular purpose and application of the distributed processing being undertaken by the nodes, overall or in the particular subsystem. For example, as discussed with respect to FIG. 4, there may be circumstances in which processing as would be performed by a particular cyclically-ordered set of nodes may be unnecessary or unwarranted.

If it is determined that processing associated with the cyclically-ordered set of nodes $C_i$ should be skipped, processing proceeds with an operation 2050. Alternatively, if it is determined that processing associated with the cyclically-ordered set of nodes $C_i$ should proceed, processing proceeds to an operation 2070.

Because, as further described below, processing by each node of a given cyclically-ordered set of nodes $C_i$ results in transactions being committed to the blockchain, the blockchain provides an audit trail as to what processing occurred. Furthermore, given the properties of a blockchain, such an audit trail may be considered tamperproof or tamper-resistant.

At the operation 2050, the initiator node $I_i$ retrieves $sv_{i+1}$ from blockchain. Additionally or alternatively, it may receive the value from $I_{i+1}$. Once $sv_{i+1}$ is obtained, the value can be used to determine $sv_i$ as that value is based on $v_i$ and on the components upon which $sv_{i+1}$ is based—i.e. the private keys $v_j$ corresponding to each node in the cyclically-ordered set of initiator nodes from the initiator node immediately subsequent to $I_i$ in the cyclically ordered set of initiator nodes through to the master initiator node. For example, where ECC is employed, $v_1$ and $sv_{i+1}$ may be summed.

From the operation 2050, processing proceeds to an operation 2060. At the operation 2060, $I_i$ submits the payment transaction $T_{Pay}$ for the payment channel $I_{i-1} \to I_i$ to the blockchain. Notably, this has the effect of revealing $sv_i$ on the blockchain, thereby allowing the next initiator node in the sequence (i.e., $I_{i-1}$) to proceed with its processing.

Following the operation 2060, the notional iterator i is decremented and, assuming there are initiator nodes remaining (i.e., i>0), processing continues at the operation 2020. Alternatively, if all initiator nodes have had a chance to execute, processing terminates.

Recall that, $I_i$ could have also have determined not to skip the processing associated with the nodes of the cyclically-ordered set $C_i$. In that scenario, as stated above, processing proceeds to the operation 2070 where processing of the cyclically-ordered set $C_i$ is initiated.

At the operation 2070, the initiator node identifies the value $sv_\in^i$. (Recall that $sv_\in^i = k_\in^i + SV_{i+1}$).

Following the operation 2070, at the operation 2080, the initiator node $I_i$ submits the $T_{pay}$ transaction in its favour to the blockchain, thereby revealing the value $sv_\in^i$. Notably, as further described below, this has the effect of revealing the value necessary for the node $U_{n_i-1}^i$ to compute the unlocking value required to submit the $T_{pay}$ transaction in its favour to the blockchain. As such, operation 2080 has the effect of triggering processing by the node $U_{n_i-1}^i$.

Iteration is required so that processing may proceed across the nodes of the cyclically-ordered set $C_i$—i.e., across the subcomponents of the corresponding subsystem. Notably as processing reaches each such node, it is triggered to perform any processing associated with that node.

Iteration starts at $j=n_i-1$ and, therefore, at the node $U_{n_i-1}^i$ of the cyclically-ordered set of nodes $C_i$.

From the operation 2080, processing proceeds to an operation 2090. At the operation 2090 it is determined whether sufficient time remains for completing the submission of the payment channels of the circuit associated with the cyclically-ordered set of nodes $C_i$.

If it is determined that sufficient time does not remain, processing proceeds to an operation 2100 where the node $U_{j-1}^i$ submits the refund transaction of the payment channel it created (i.e., $T_r: U_{j-1}^i \to U_j^i$) to the blockchain, thereby initiating the other nodes of $C_i$ submitting corresponding refund transactions $T_r: U_k^i \to U_{k+1}^i$ in turn.

Alternatively, if it is determined at the operation 2090 that sufficient time does remain, processing proceeds to an operation 2110.

At the operation 2110, the next node in the circuit associated with the cyclically-ordered set of nodes Ci, $U_j^i$ retrieves the $sv_{j+1}^i$ from the payment transaction the previous node in the sequence submitted to the blockchain (i.e., $T_{Pay}: U_{j+1}^i$) and determines $sv_j^i$ based on that value and on its keyshare $k_j^i$. For example, where ECC is employed, it may compute $sv_j^i = k_j^i + sv_{j+1}^i$.

From the operation 2110, processing proceeds to an operation 2120. At the operation 2120, the node $U_j^i$ submits the payment transaction of the payment channel in its favour (i.e., $T_{Pay}: U_{j-1}^i \to U_j^i$) to the blockchain. Notably, this has the effect of publicly revealing $sv_j^i$ on the blockchain.

From the operation 2120, the notional iterator j is decremented as processing advances to the next node in the cyclically-ordered set of nodes $C_i$. If nodes remain in that set that have not yet completed processing, processing proceeds with the operation 2090. Alternatively, if processing has completed for all nodes in $C_i$, control flow returns to the operation 2050.

At the operation 2050, as noted above, the next initiator node ($I_i$) retrieves $SV_{i+1}$ from the blockchain so that it can calculate $SV_i$ and then, at the operation 2060, submits the $T_{Pay}$ transaction of a payment channel in its favour unlocked using $SV_i$—i.e., of a payment channel as would have been prepared by the node immediately previous the initiator node $I_i$. Notably, however, because the secret values associated with each of the nodes of the cyclically-ordered set $C_i$ are keyshares of $v_i$ and those values will have all been revealed on the blockchain by submission of payment transaction in favour of the nodes of the cyclically-ordered set $C_i$, even if $I_i$ fails to submit the $T_{Pay}$ transaction for the payment channel $I_{i-1} \to I_i$ to the blockchain, processing by nodes of the cyclically-ordered set $C_i$ may still be initiated by the next initiator node by $I_{i-1}$ reconstructing $v_i$ using the revealed keyshares.

The above-mentioned embodiments relate to, in effect, a cyclically-ordered set of cyclically-ordered sets, the latter reference to the cyclically-ordered sets $C_i$ and the former referring to the relationship therebetween defined by the cyclically-ordered set of initiators (each member of that set also being a member of one of the cyclically-ordered sets $C_i$ with the exception of the master initiator node). In other words, the above-mentioned embodiments effectively relate to cyclically-ordered sets in two dimensions. In some embodiments, the subject matter of the above-mentioned embodiments may be further generalized to allow for greater dimensions. For example, a cyclically-ordered set of initiator nodes may be defined, with each of those nodes being a master initiator of a respective further cyclically-ordered set of initiator nodes and then each of those initiator nodes being the initiator of a respective cyclically-ordered set, thereby providing for three-dimensions.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method in a system comprising:
   a first cyclically-ordered set of nodes participating in a blockchain network, comprising a first initiator node and a second node immediately subsequent to the first initiator node in the first set;
   a second cyclically-ordered set of nodes, all being initiator nodes, wherein:
   each initiator node in said second set is an initiator node of a respective one of a plurality of cyclically-ordered sets of nodes, the plurality of cyclically-ordered sets of nodes including the first set, and
   said second set comprises a first master initiator node, the first initiator node, a second initiator node immediately previous to the first initiator node in the second set, and a third initiator node immediately subsequent to the first initiator node in the second set; and
   a third cyclically-ordered set of nodes, all being master initiator nodes, wherein:
   each master initiator node in said third set is a master initiator node of a respective one of a plurality of cyclically-ordered sets of initiator nodes, the plurality of cyclically-ordered sets of nodes including the second set, and
   said third set comprises a master master initiator node, the first master initiator node, a second master initiator node immediately previous to the first master initiator node in the third set, and a third master initiator node immediately subsequent to the first master initiator node in the third set;
   said method comprising:
   generating, by the first initiator node, a first private key;
   sending, by the first initiator node to the first master initiator node, a first public key corresponding to the first private key;
   generating, by the first initiator node, a cryptographic share of the first private key for each of the nodes of the first set and distributing respective ones of the cryptographic shares to the other nodes of the first set;
   generating, by the first master initiator node, a second private key;
   determining, by the first initiator node, a first locking value based on public keys corresponding to each of the cryptographic shares;
   receiving, by the first initiator node from the second initiator node, a first value based on public keys associated with each node in the second set from the first initiator node through to the first master initiator node;
   sending, by the first master initiator node to the master master initiator node, a second public key corresponding to the second private key;
   receiving, by the first master initiator node from the second master initiator node, a second value based on public keys associated with each node in the third set from the first master initiator node through to the master master initiator node;
   preparing, by the first initiator node, a transaction arranged to transmit control of a resource from a source address associated with the first initiator node to a receiving address of the second node responsive to satisfaction of an execution condition including supply of a first unlocking value corresponding to the first locking value; and
   initiating, by the first initiator node, preparation of further transactions to form a circuit of transactions between each pair of adjacent nodes in the first set, each of the further transactions arranged to transmit control of a respective resource from an address associated with a first node of each pair to an address associated a second node of that pair responsive to satisfaction of an execution condition including supply of a respective unlocking value corresponding to a respective locking value, wherein the second node of each pair is immediately subsequent in the first set to the first node of that pair, and wherein the respective locking value determined based on the cryptographic share that was distributed to the first node of a given pair and a value received from a node immediately previous that node in the first set.

2. The method according to claim 1, further comprising:
   determining, by the first initiator node, a second locking value based on the first value and the first public key corresponding to the first private key; and
   preparing, by the first initiator node, a transaction arranged to transmit control of a resource from a source address associated with the first initiator node to a receiving address of the third initiator node responsive to satisfaction of an execution condition including supply of a second unlocking value corresponding to the second locking value.

3. The method according to claim 2, further comprising:
   determining, by the first master initiator node, a third locking value based on the second value and the second public key corresponding to the second private key; and
   preparing, by the first master initiator node, a transaction arranged to transmit control of a resource from a source address associated with the first master initiator node to a receiving address of the third master initiator node responsive to satisfaction of an execution condition including supply of a third unlocking value corresponding to the third locking value.

4. The method according to claim 1, further comprising:
   obtaining, by the first initiator node, a third value based on private keys corresponding to public keys associated with each node in the second set from the third initiator node through to the master initiator node.

5. The method of claim 4 wherein the third value is obtained by the first initiator node from the blockchain.

6. The method of claim 4 wherein the third value is obtained by the first initiator node from the third initiator node.

7. The method according to claim 4, further comprising:
determining, by the first initiator node that execution of the circuit of transactions should not be initiated; and
responsive to determining that execution of the circuit of transactions should not be initiated:
determining, by the first initiator node, a third unlocking value based on the third value and the first private key; and
executing, by the first initiator node using the third unlocking value, a transaction prepared by the second initiator node and arranged to transmit control of a resource from a source address associated with second initiator node to a receiving address of the first initiator node, wherein control of the resource is to be transmitted responsive to satisfaction of an execution condition including supply of the third unlocking value.

8. The method according to claim 4 wherein the first locking value is further based on the third value.

9. The method according to claim 4, further comprising:
determining, by the first initiator node that execution of the circuit of transactions should be initiated;
responsive to determining that execution of the circuit of transactions should be initiated:
determining, by the first initiator node, a fourth unlocking value based on the second value and on a respective one of the cryptographic shares of the first private key; and
executing, by the first initiator node using the fourth unlocking value, a transaction prepared by a node immediately previous the initiator node in the first cyclically-ordered set of nodes arranged to transmit control of a resource from a source address associated with the immediately previous node to a receiving address of the initiator node, wherein control of the resource is to be transmitted responsive to satisfaction of an execution condition including supply of the fourth unlocking value.

10. The method according to claim 1 wherein the initiating the preparation of further transactions to form a circuit of transactions between each pair of adjacent nodes in the first set includes sending, by the first initiator node, the first locking value to the node immediately subsequent to the first initiator node in the first set.

11. The method according to claim 1 wherein each of the resources is of the same quantum as other resources of the resources.

12. The method according to claim 1 wherein each public key and its corresponding private key form an elliptic curve cryptography public-private key pair.

13. The method according to claim 1 wherein the cryptographic shares of the private key are generated used a publicly verifiable cryptographic secret sharing algorithm.

14. A computer implemented system for carrying out a method according to claim 1.

15. A non-transitory computer-readable storage medium storing instructions for adapting a computer system to perform a method according to claim 1.

* * * * *